US011855920B2

(12) United States Patent
Hu et al.

(10) Patent No.: US 11,855,920 B2
(45) Date of Patent: Dec. 26, 2023

(54) RESOURCE UNIT COMBINATION INDICATION METHOD AND COMMUNICATIONS APPARATUS

(71) Applicant: Huawei Technologies Co., Ltd., Shenzhen (CN)

(72) Inventors: Mengshi Hu, Shenzhen (CN); Jian Yu, Shenzhen (CN); Oded Redlich, Hod Hasharon (IL); Genadiy Tsodik, Hod Hasharon (IL); Shimon Shilo, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/331,787

(22) Filed: Jun. 8, 2023

(65) Prior Publication Data

US 2023/0318764 A1    Oct. 5, 2023

Related U.S. Application Data

(63) Continuation of application No. 17/811,457, filed on Jul. 8, 2022, which is a continuation of application No. PCT/CN2021/070851, filed on Jan. 8, 2021.

(30) Foreign Application Priority Data

Jan. 10, 2020    (CN) .......................... 202010028036.6

(51) Int. Cl.
*H04W 4/00* (2018.01)
*H04L 5/00* (2006.01)
*H04W 80/02* (2009.01)

(52) U.S. Cl.
CPC .......... *H04L 5/0044* (2013.01); *H04L 5/0094* (2013.01); *H04W 80/02* (2013.01)

(58) Field of Classification Search
CPC ..... H04L 5/0044; H04L 5/0094; H04W 80/02
See application file for complete search history.

(56) References Cited

U.S. PATENT DOCUMENTS 10,219,271 B1    2/2019  Hedayat et al.
2017/0048862 A1  2/2017  Choi et al.
(Continued)

FOREIGN PATENT DOCUMENTS

CA    2946926 A1    1/2017
CN    107005393 A   8/2017
(Continued)

OTHER PUBLICATIONS

IEEE Computer Society, "Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN", IEEE P802.11ax™/D4.3, Aug. 2019, 782 pages.
(Continued)

*Primary Examiner* — Thai D Hoang
(74) *Attorney, Agent, or Firm* — Slater Matsil, LLP

(57) ABSTRACT

This application provides a resource unit combination indication method and a communications apparatus. The method includes: determining a physical layer protocol data unit PPDU, where the PPDU includes a signal field, the signal field includes a resource unit allocation subfield and a combination indication corresponding to the resource unit allocation subfield, the resource unit allocation subfield indicates a plurality of resource units, and the combination indication indicates combination information of the plurality of resource units; and sending the PPDU. The method provided in this application can support one or more users in transmitting data by using a plurality of contiguous or
(Continued)

discontiguous RUs, and indicate a combination status of the plurality of RUs to the user.

20 Claims, 17 Drawing Sheets

(56) References Cited

U.S. PATENT DOCUMENTS

| | | | |
|---|---|---|---|
| 2019/0069298 A1 | 2/2019 | Chen et al. | |
| 2019/0132743 A1* | 5/2019 | Vanka | H04W 16/10 |
| 2019/0238288 A1 | 8/2019 | Liu et al. | |
| 2019/0260531 A1* | 8/2019 | Chen | H04L 5/0041 |
| 2021/0409172 A1* | 12/2021 | Chen | H04L 5/0007 |
| 2022/0006594 A1* | 1/2022 | Kim | H04L 5/0037 |
| 2022/0132371 A1* | 4/2022 | Wu | H04W 72/02 |
| 2022/0353029 A1* | 11/2022 | Hu | H04L 5/0044 |
| 2023/0109874 A1* | 4/2023 | Gan | H04W 72/0446 370/329 |
| 2023/0121851 A1* | 4/2023 | Hu | H04L 5/0053 375/262 |
| 2023/0224070 A1* | 7/2023 | Lim | H04L 1/0003 370/329 |
| 2023/0239071 A1* | 7/2023 | Lim | H04L 5/00 370/329 |

FOREIGN PATENT DOCUMENTS

| | | | |
|---|---|---|---|
| CN | 107113830 A | | 8/2017 |
| CN | 107925470 A | | 4/2018 |
| CN | 110460415 A | | 11/2019 |
| CN | 115334664 A | * | 11/2022 |
| CN | 115499089 A | * | 12/2022 |
| KR | 20220001433 A | * | 1/2022 |
| TW | 202201994 A | * | 1/2022 |
| WO | 2019149243 A1 | | 8/2019 |
| WO | WO-2020093890 A1 | * | 5/2020 |
| WO | WO-2020233214 A1 | * | 11/2020 |
| WO | WO-2022002206 A1 | * | 1/2022 |
| WO | WO-2022184042 A1 | * | 9/2022 |
| WO | WO-2022237520 A1 | * | 11/2022 |
| WO | WO-2022242605 A1 | * | 11/2022 |
| WO | WO-2022252950 A1 | * | 12/2022 |

OTHER PUBLICATIONS

IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications", IEEE Std 802.11™-2016, Dec. 7, 2016, 3534 pages.

Ross, J.Y. et al., "Multiple RU discussion", IEEE 802.11-19/1914r0, Nov. 6, 2019, 7 pages.

Liu, J. et al., "Multiple RU Combinations for EHT", IEEE 802.11-19/1907r0, Nov. 12, 2019, 19 pages.

Porat, R. et al., "Multi-RU Support", IEEE 802.11-19/1908r0, Nov. 8, 2019, 15 pages.

* cited by examiner

| Resource unit allocation subfield (First 242-tone RU) | CRC + Tail (Tail) | Per station field (First 242-tone RU) |

FIG. 6

| | | | |
|---|---|---|---|
| CC 1 | Resource unit allocation subfield (First 242-tone RU) | CRC + Tail (Tail) | Per station field (First 242-tone RU) |
| CC 2 | Resource unit allocation subfield (Second 242-tone RU) | CRC + Tail (Tail) | Per station field (Second 242-tone RU) |

FIG. 7

| | | | | |
|---|---|---|---|---|
| CC 1 | Resource unit allocation subfield (First 242-tone RU) | Resource unit allocation subfield 3 (Third 242-tone RU) | Center 26-subcarrier resource unit indication (Center 26-Tone RU indication) | CRC + Tail (Tail) | Per station field (First and third 242-tone RUs) |
| CC 2 | Resource unit allocation subfield (Second 242-tone RU) | Resource unit allocation subfield 3 (Fourth 242-tone RU) | Center 26-subcarrier resource unit indication (Center 26-Tone RU indication) | CRC + Tail (Tail) | Per station field (Second and fourth 242-tone RUs) |
| CC 1 | Resource unit allocation subfield (First 242-tone RU) | Resource unit allocation subfield 3 (Third 242-tone RU) | Center 26-subcarrier resource unit indication (Center 26-Tone RU indication) | CRC + Tail (Tail) | Per station field (First and third 242-tone RUs) |
| CC 2 | Resource unit allocation subfield (Second 242-tone RU) | Resource unit allocation subfield 3 (Fourth 242-tone RU) | Center 26-subcarrier resource unit indication (Center 26-Tone RU indication) | CRC + Tail (Tail) | Per station field (Second and fourth 242-tone RUs) |

FIG. 8

| CC 1 | Common field (Common field) | Part of a multi-resource unit allocation field | Per station field (User specific field) |
|---|---|---|---|
| CC 2 | Common field (Common field) | Another part of the multi-resource unit allocation field | Per station field (User specific field) |

FIG. 12

| CC 1 | Common field (Common field) | Multi-resource unit allocation field | Per station field (User specific field) |
|---|---|---|---|
| CC 2 | Common field (Common field) | Multi-resource unit allocation field | Per station field (User specific field) |

FIG. 13

RESOURCE UNIT COMBINATION INDICATION METHOD AND COMMUNICATIONS APPARATUS

CROSS-REFERENCE TO RELATED APPLICATIONS

This application is a continuation of U.S. patent application Ser. No. 17/811,457, filed on Jul. 8, 2022, which is a continuation of International Application No. PCT/CN2021/070851, filed on Jan. 8, 2021, which claims priority to Chinese Patent Application No. 202010028036.6, filed on Jan. 10, 2020. All of the afore-mentioned patent applications are hereby incorporated by reference in their entireties.

TECHNICAL FIELD

This application relates to the communications field, and more specifically, to a resource unit combination indication method and a communications apparatus.

BACKGROUND

With evolution of 802.11 standards of a wireless local area network (WLAN) system, the 802.11 standards need to be further improved in resource allocation. In resource allocation of user frequency band, a frequency band resource of a user is allocated in a form of a resource unit (RU). For example, one 20-MHz channel in 802.11ax may include a plurality of RUs in a form of a 26-tone RU, a 52-tone RU, or a 106-tone RU. A tone indicates a subcarrier.

However, 802.11ax currently supports only allocation of a single RU to one or more users, but does not support allocation of a plurality of contiguous or discontiguous RUs to one or more users for use. This reduces RU allocation flexibility of the system, and causes low spectrum utilization of the system in a case of preamble puncturing.

SUMMARY

This application provides a resource unit combination indication method and a communications apparatus, to support one or more users in transmitting data by using a plurality of contiguous or discontiguous RUs, and indicate a combination status of the plurality of RUs to the user. This improves RU allocation flexibility of a system, and improves spectrum utilization of the system.

According to a first aspect, a resource unit combination indication method is provided. The method may be performed by a sending device. For example, the sending device may be an AP, or may be a chip applied to the sending device. The method includes: determining a physical layer protocol data unit PPDU, where the PPDU includes a signal field, the signal field includes a resource unit allocation subfield and a combination indication corresponding to the resource unit allocation subfield, the resource unit allocation subfield indicates a plurality of resource units, and the combination indication indicates combination information of the plurality of resource units; and sending the PPDU.

According to the resource unit combination indication method provided in the first aspect, the combination indication in the signal field may indicate a combination status of small-size RUs within a 20-MHz channel, to support one or more users in transmitting data by using a plurality of contiguous or discontiguous RUs, and indicate a combination status of the plurality of RUs to the user. This improves RU allocation flexibility of a system, and improves spectrum utilization of the system.

According to a second aspect, a resource unit combination indication method is provided. The method may be performed by a receiving device. For example, the receiving device may be a STA, or may be a chip applied to the receiving device. The method includes: receiving a physical layer protocol data unit PPDU, where the PPDU includes a signal field, the signal field includes a resource unit allocation subfield and a combination indication corresponding to the resource unit allocation subfield, the resource unit allocation subfield indicates a plurality of resource units, and the combination indication indicates combination information of the plurality of resource units; and determining the combination information of the plurality of resource units based on the PPDU.

According to the resource unit combination indication method provided in the second aspect, the combination indication in the signal field may indicate, to a user, a combination status of small-size RUs within a 20-MHz channel, to support one or more users in transmitting data by using a plurality of contiguous or discontiguous RUs. This improves RU allocation flexibility of a system, and improves spectrum utilization of the system.

In a possible implementation of the first aspect or the second aspect, the small-size RUs within the 20-MHz channel include a 26-tone RU, a 52-tone RU, and a 106-tone RU.

In a possible implementation of the first aspect or the second aspect, the small-size RUs are not combined across the 20-MHz channel.

In a possible implementation of the first aspect or the second aspect, combining the small-size RUs includes: combining one 26-tone RU and one 52-tone RU into one multi-RU, combining one 26-tone RU and one 106-tone RU into one multi-RU, or combining one 52-tone RU and one 106-tone RU into one multi-RU.

In a possible implementation of the first aspect or the second aspect, for the combination of the small-size RUs, locations of the 26-tone RU, the 52-tone RU, and the 106-tone RU that need to be combined are not limited.

In a possible implementation of the first aspect or the second aspect, the combination indication is included in the resource unit allocation subfield; or the signal field further includes a multi-resource unit allocation field, and the multi-resource unit allocation field includes the combination indication.

In a possible implementation of the first aspect or the second aspect, the signal field may be an HE-SIG-B field, an EHT-SIG field, or a signal field in 802.11 in a future network system.

In a possible implementation of the first aspect or the second aspect, the combination indication includes 2 bits, the combination indication indicates a quantity of multi-RUs obtained by combining the plurality of resource units, and one multi-RU is formed by combining at least two resource units in the plurality of resource units.

In a possible implementation of the first aspect or the second aspect, when there is one multi-RU, the multi-RU is formed by combining one 26-tone RU and one 52-tone RU, by combining one 26-tone RU and one 106-tone RU, or by combining one 52-tone RU and one 106-tone RU; when there are two multi-RUs, in the two multi-RUs, one multi-RU is formed by combining one 26-tone RU and one 52-tone RU, and the other multi-RU is formed by combining one 26-tone RU and one 106-tone RU; or each of the two multi-RUs is formed by combining one 26-tone RU and one 52-tone RU; or when there are three multi-RUs, each of the three multi-RUs is formed by combining one 26-tone RU and one 52-tone RU.

In a possible implementation of the first aspect or the second aspect, the combination indication includes 1 bit, a first value of the combination indication indicates that the plurality of resource units are not combined, and a second value of the combination indication indicates that at least two RUs in the plurality of resource units are combined into a multi-RU.

Optionally, when the at least two RUs in the plurality of resource units are combined into the multi-RU, the multi-RU is formed by combining a 56-tone RU and a neighboring 26-tone RU, the multi-RU is formed by combining a 106-tone RU and a neighboring 26-tone RU, or the multi-RU is formed by combining a 106-tone RU and a 52-tone RU.

In a possible implementation of the first aspect or the second aspect, a first value of the combination indication indicates that the plurality of resource units are not combined; a second value of the combination indication indicates that a first 52-tone RU or a first 106-tone RU in the plurality of resource units is combined with a neighboring 26-tone RU; a third value of the combination indication indicates that a second 106-tone RU in the plurality of resource units is combined with a neighboring 26-tone RU; and a fourth value of the combination indication indicates that a third 52-tone RU in the plurality of resource units is combined with a neighboring 26-tone RU.

According to a third aspect, a resource unit combination indication method is provided. The method may be performed by a sending device. For example, the sending device may be an AP, or may be a chip applied to the sending device. The method includes: determining a physical layer protocol data unit PPDU, where the PPDU includes a signal field, the signal field includes a plurality of resource unit allocation subfields and a plurality of combination indications, the plurality of resource unit allocation subfields indicate a plurality of resource units, the plurality of combination indications indicate combination information of the plurality of resource units, one combination indication corresponds to an RU indicated by one resource unit allocation subfield, and one resource unit is a 242-tone RU, a 484-tone RU, or a 996-tone RU; and sending the PPDU.

According to the resource unit combination indication method provided in the third aspect, the combination indication in the signal field may indicate a combination status of large-size RUs across a 242-tone RU, to support one or more users in transmitting data by using a plurality of contiguous or discontiguous large-size RUs, and indicate a combination status of the plurality of large-size RUs to the user. This improves RU allocation flexibility of a system, and improves spectrum utilization of the system in a case of preamble puncturing.

According to a fourth aspect, a resource unit combination indication method is provided. The method may be performed by a receiving device. For example, the receiving device may be a STA, or may be a chip applied to the receiving device. The method includes: receiving a physical layer protocol data unit PPDU, where the PPDU includes a signal field, the signal field includes a plurality of resource unit allocation subfields and a plurality of combination indications, the plurality of resource unit allocation subfields indicate a plurality of resource units, the plurality of combination indications indicate combination information of the plurality of resource units, one combination indication corresponds to an RU indicated by one resource unit allocation subfield, and one resource unit is a 242-tone RU, a 484-tone RU, or a 996-tone RU; and determining the combination information of the plurality of resource units based on the PPDU.

According to the resource unit combination indication method provided in the fourth aspect, the received combination indication in the signal field may be used to determine a combination status of large-size RUs across a 242-tone RU, to support one or more users in transmitting data by using a plurality of contiguous or discontiguous large-size RUs. This improves RU allocation flexibility of a system, and improves spectrum utilization of the system in a case of preamble puncturing.

In a possible implementation of the third aspect or the fourth aspect, the signal field may be an HE-SIG-B field, an EHT-SIG field, or a signal field in 802.11 in a future network system.

In a possible implementation of the third aspect or the fourth aspect, the combination indication is included in the corresponding resource unit allocation subfield; or the signal field further includes a multi-resource unit allocation field, and the multi-resource unit allocation field includes the plurality of combination indication.

In a possible implementation of the third aspect or the fourth aspect, an RU corresponding to the combination indication is the 242-tone RU, the 484-tone RU, or the 996-tone RU.

In a possible implementation of the third aspect or the fourth aspect, a first value of the combination indication indicates that an RU corresponding to the combination indication is not combined; and at least two RUs corresponding to at least two combination indications, in the plurality of combination indications, whose values are all a second value are combined.

In a possible implementation of the third aspect or the fourth aspect, a first value of the combination indication indicates that an RU corresponding to the combination indication is not combined; a second value of the combination indication indicates that an RU corresponding to the combination indication and another RU are combined into a multi-RU, and the RU is an initial RU in the multi-RU; a third value of the combination indication indicates that an RU corresponding to the combination indication and another RU are combined into a multi-RU, and the RU is a center RU in the multi-RU; and a fourth value of the combination indication indicates that an RU corresponding to the combination indication and another RU are combined into a multi-RU, and the RU is a tail RU in the multi-RU.

In a possible implementation of the third aspect or the fourth aspect, a first value of the combination indication indicates that an RU corresponding to the combination indication is not combined; and a second value of the combination indication indicates that an RU corresponding to the combination indication and another RU at a preset location are combined into a multi-RU.

According to a fifth aspect, a communications apparatus is provided. The apparatus includes units configured to perform the steps in any one of the first aspect or the possible implementations of the first aspect, or units configured to perform the steps in any one of the third aspect or the possible implementations of the third aspect.

According to a sixth aspect, a communications apparatus is provided. The apparatus includes units configured to perform the steps in any one of the second aspect or the possible implementations of the second aspect, or units configured to perform the steps in any one of the fourth aspect or the possible implementations of the fourth aspect.

According to a seventh aspect, a communications apparatus is provided. The apparatus includes at least one processor and a memory. The at least one processor is configured to perform the method in any one of the first aspect or the possible implementations of the first aspect, or is configured to perform the method in any one of the third aspect or the possible implementations of the third aspect.

According to an eighth aspect, a communications apparatus is provided. The apparatus includes at least one processor and a memory. The at least one processor is configured to perform the method in any one of the second aspect or the possible implementations of the second aspect, or is configured to perform the method in any one of the fourth aspect or the possible implementations of the fourth aspect.

According to a ninth aspect, a communications apparatus is provided. The apparatus includes at least one processor and an interface circuit. The at least one processor is configured to perform the method in any one of the first aspect or the possible implementations of the first aspect, or is configured to perform the method in any one of the third aspect or the possible implementations of the third aspect.

According to a tenth aspect, a communications apparatus is provided. The apparatus includes at least one processor and an interface circuit. The at least one processor is configured to perform the method in any one of the second aspect or the possible implementations of the second aspect, or is configured to perform the method in any one of the fourth aspect or the possible implementations of the fourth aspect.

According to an eleventh aspect, a network device is provided. The network device includes the communications apparatus provided in the fifth aspect, the network device includes the communications apparatus provided in the seventh aspect, or the network device includes the communications apparatus provided in the ninth aspect.

According to a twelfth aspect, a terminal device is provided. The terminal device includes the communications apparatus provided in the sixth aspect, the terminal device includes the communications apparatus provided in the eighth aspect, or the terminal device includes the communications apparatus provided in the tenth aspect.

According to a thirteenth aspect, a computer program product is provided. The computer program product includes a computer program. When being executed by a processor, the computer program is used to perform the method in any one of the first aspect to the fourth aspect or the possible implementations of the first aspect to the fourth aspect.

According to a fourteenth aspect, a computer-readable storage medium is provided. The computer-readable storage medium stores a computer program. When being executed, the computer program is used to perform any one of the first aspect to the fourth aspect or the method according to any one of the first aspect to the fourth aspect.

According to a fifteenth aspect, a communications system is provided. The communications system includes the apparatus provided in the fifth aspect and the apparatus provided in the sixth aspect; the system includes the apparatus provided in the seventh aspect and the apparatus provided in the eighth aspect; the system includes the apparatus provided in the ninth aspect and the apparatus provided in the tenth aspect; or the system includes the network device provided in the eleventh aspect and the terminal device provided in the twelfth aspect.

According to a sixteenth aspect, a chip is provided. The chip includes a processor, configured to invoke a computer program from a memory and run the computer program, so that a communications device in which the chip is installed performs the method in any one of the first aspect to the fourth aspect or the possible implementations of the first aspect to the fourth aspect, or performs the method in any one of the second aspect or the possible implementations of the second aspect.

BRIEF DESCRIPTION OF THE DRAWINGS

FIG. 6 is a schematic diagram of a structure of a content channel when a data packet bandwidth is 20 MHz;

FIG. 7 is a schematic diagram of a structure of a content channel when a data packet bandwidth is 40 MHz;

FIG. 8 is a schematic diagram of a structure of a content channel when a data packet bandwidth is 80 MHz;

FIG. 12 is a schematic diagram of an example of a multi-resource unit allocation field according to an embodiment of this application;

FIG. 13 is a schematic diagram of another example of a multi-resource unit allocation field according to an embodiment of this application;

DETAILED DESCRIPTION OF ILLUSTRATIVE EMBODIMENTS

The following describes technical solutions of this application with reference to accompanying drawings.

The technical solutions in embodiments of this application may be applied to various communications systems, for example, a wireless local area network (WLAN) system. For example, embodiments of this application may be applied to any one of 802.11ac/802.11ax/802.11be in the Institute of Electrical and Electronics Engineers (IEEE) 802.11 series protocols currently used in the WLAN or future IEEE 802.11 series protocols.

Figure 1:
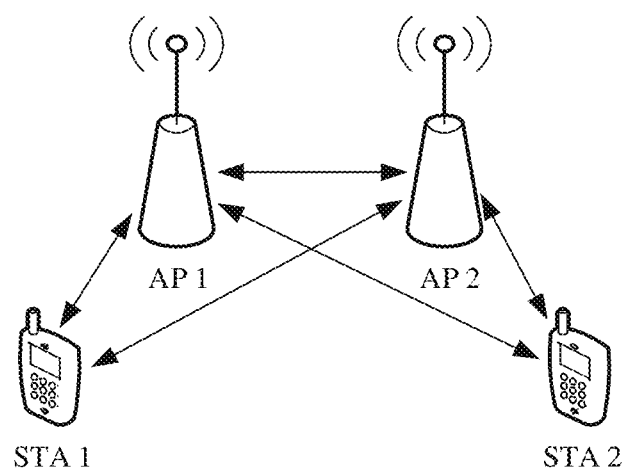
FIG. 1 is a schematic diagram of a communications system applicable to an embodiment of this application.

FIG. 1 is a schematic diagram of a communications system applicable to an embodiment of this application. The communications system shown in FIG. 1 may be a WLAN system or a wide area network system. The communications system in FIG. 1 may include one or more APs and one or more STAs. In FIG. 1, two APs (an AP 1 and an AP 2) and two user stations (STA) (a STA 1 and a STA 2) are used as an example. Wireless communication may be performed between the APs, between the AP and the STA, and between the STAs by using various standards. The solutions provided in this application may be applied to the communication between the APs, the communication between the STAs, and the communication between the AP and the STA.

The user station (STA) may also be referred to as a terminal, a subscriber unit, an access terminal, a mobile station, a remote station, a remote terminal, a mobile device, a user terminal, a wireless communications device, a user agent, a user apparatus, or user equipment (UE). The station may be a wireless communications chip, a wireless sensor, or a wireless communications terminal. For example, the station is a mobile phone supporting a wireless fidelity (Wi-Fi) communications function; a tablet computer supporting a Wi-Fi communications function; a set-top box supporting a Wi-Fi communications function; a smart television supporting a Wi-Fi communications function; a smart wearable device supporting a Wi-Fi communications function; a vehicle-mounted communications device supporting a Wi-Fi communications function; a computer supporting a Wi-Fi communications function; a smart home device, for example, a smart camera, a smart water meter, or a sensor supporting a Wi-Fi communications function; or an Internet of Vehicles device, an Internet of Things devices, a sensor, or the like supporting a Wi-Fi communications function. Optionally, the station may support a device of the 802.11 standard in a current network system or a future network system.

The access point AP in this application is an apparatus that is deployed in a wireless communications network and that provides a wireless communications function for a station, and may be used as a hub of a WLAN. The access point AP may alternatively be a base station, a router, a gateway, a repeater, a communications server, a switch, a bridge, or the like. The base station may include various forms of macro base stations, micro base stations, relay nodes, and the like. For ease of description, the apparatus that provides the wireless communications function and a wireless communications service for the station STA is collectively referred to as an access point or AP.

In this embodiment of this application, the AP may communicate with the STA by using a wireless local area network, and data of the STA is transmitted to a network side, or data from a network side is transmitted to the STA. The AP is also referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge that connects the wired network and a wireless network. The AP is mainly used to connect wireless network clients to each other, and then connect the wireless network to the Ethernet. Specifically, the AP may be a terminal device or a network device with a Wi-Fi chip. Optionally, the AP may be a device that supports the 802.11 standard in the current network system or the future network system.

Specifically, wireless communication may be performed between the AP and the STA by using a multi-user multiple-input multiple-output (MU-MIMO) technology. In this embodiment of this application, each STA is equipped with one or more antennas. Each AP supports multi-site coordination and/or joint transmission.

It should be further understood that FIG. 1 is merely a schematic diagram. The communications system may further include another network device or terminal device, for example, may further include a wireless relay device and a wireless backhaul device, which are not shown in FIG. 1. Quantities of APs and STAs included in the communications system are not limited in this embodiment of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD), a digital versatile disc (DVD), or the like), and a smart card and a flash memory component (for example, an erasable programmable read-only memory (EPROM), a card, a stick, a key drive, or the like). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

In terms of bandwidth configurations, bandwidth configurations currently supported in 802.11ax include: 20 MHz, 40 MHz, 80 MHz, 160 MHz, and 80+80 MHz. A difference between 160 MHz and 80+80 MHz is that 160 MHz is a continuous frequency band, and two 80 MHz in 80+80 MHz may be separated. A configuration such as 320 MHz is supported in 802.11be.

In resource allocation of user frequency band, a frequency band resource of a user is allocated in a form of a resource unit (RU) instead of in a form of a channel. One 20-MHz channel in 802.11ax may include a plurality of RUs in a form of a 26-tone RU, a 52-tone RU, or a 106-tone RU. A tone indicates a subcarrier. For example, the 26-tone RU indicates an RU including 26 subcarriers, and the 26-tone RU may be allocated to one user for use. In addition, the RU may alternatively be allocated to one or more users in a form of 242-tone, 484-tone, 996-tone, or the like.

However, 802.11ax currently supports allocation of only a single RU to one or more users. For example, a quantity of MU-MIMO users that is supported by a resource unit (106-tone RU) whose size (size) is greater than or equal to 106 subcarriers may be smaller than or equal to 8. However, 802.11ax does not support allocation of a plurality of contiguous or discontiguous RUs to one or more users for use. This reduces RU allocation flexibility of the system, and causes low spectrum utilization of the system in a case of preamble puncturing.

In view of this, this application provides a resource unit combination indication method, to support one or more users in transmitting data by using a plurality of contiguous or discontiguous RUs, and indicate a combination status of the plurality of RUs to the user. This improves RU allocation flexibility of a system, and improves spectrum utilization of the system.

To describe the method provided in this application more clearly, RU allocation and indication manners are first briefly described.

Currently, a signal (SIG) field is mainly used to notify the user of the RU allocation. The SIG field is separately encoded on each 20-MHz channel. For example, the signal field may be a high efficiency signal field B (HE-SIG-B), an extremely high throughput signal field (EHT-SIG), or a signal field in 802.11 in a future network system. An information structure of the SIG field on each 20-MHz channel is shown in FIG. 2.

Figure 2:
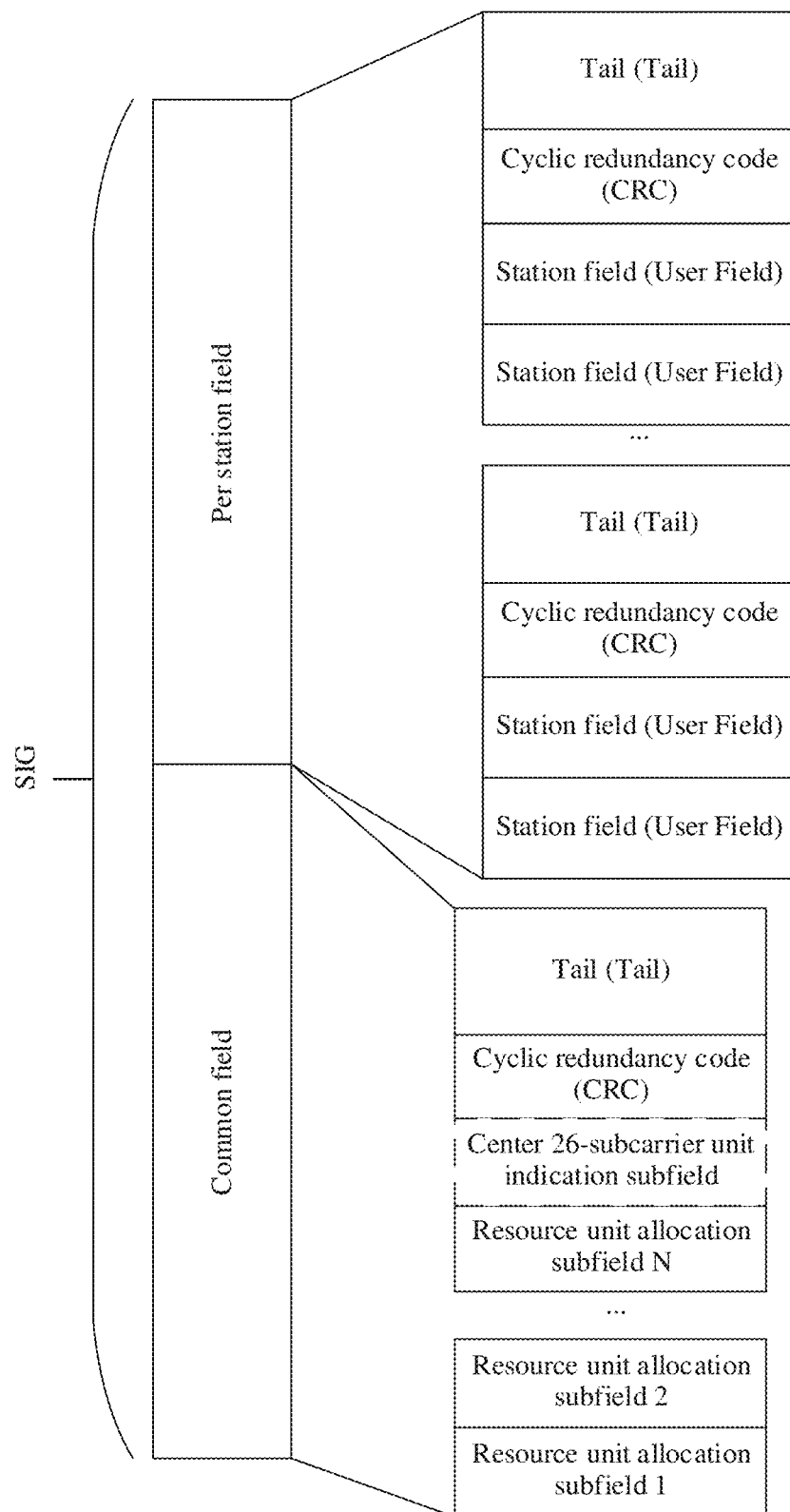
FIG. 2 is a schematic diagram of a structure of an HE-SIG field on a 20-MHz channel.

As shown in FIG. 2, the HE-SIG field is divided into two parts. A first part is a common field, including 1 to N resource unit (RU) allocation subfields (RU allocation subfields), a center 26-subcarrier (Center 26-Tone) resource unit indication subfield (Center 26-Tone RU indication) existing when a bandwidth is greater than or equal to 80 MHz, a cyclic redundancy code (CRC) used for check, and a tail subfield used for cyclic decoding. One resource unit allocation subfield corresponds to allocation of frequency domain resource units of one 20-MHz channel, and one resource unit subfield indicates a size and a location of one or more resource units included in the 20-MHz channel. In a per station field (which may also be referred to as a user specific field), there are 1 to M station fields (User Fields) based on a sequence of an allocation of resource units. Usually, two of the M station fields form a group, and every two station fields are followed by one CRC and one tail field. In addition to a last group, there may be one or two station fields. In this application, the station field may also be referred to as a user field.

One resource unit allocation subfield is one resource unit allocation index, and one resource unit allocation index indicates a size and a location of one or more resource units included in the 20-MHz channel. A sequence of at least one station field corresponds to a sequence of an allocation of resource units. Each station field indicates station information of an allocated STA in an RU included in resource unit allocation. When resource unit arrangement and combination indicated in the resource unit allocation subfield includes a resource unit including at least 106 subcarriers, the resource unit allocation index further indicates a quantity of MU-MIMO users that is supported by the resource unit including at least 106 subcarriers. The quantity of MU-MIMO users is smaller than or equal to 8.

Figure 3:
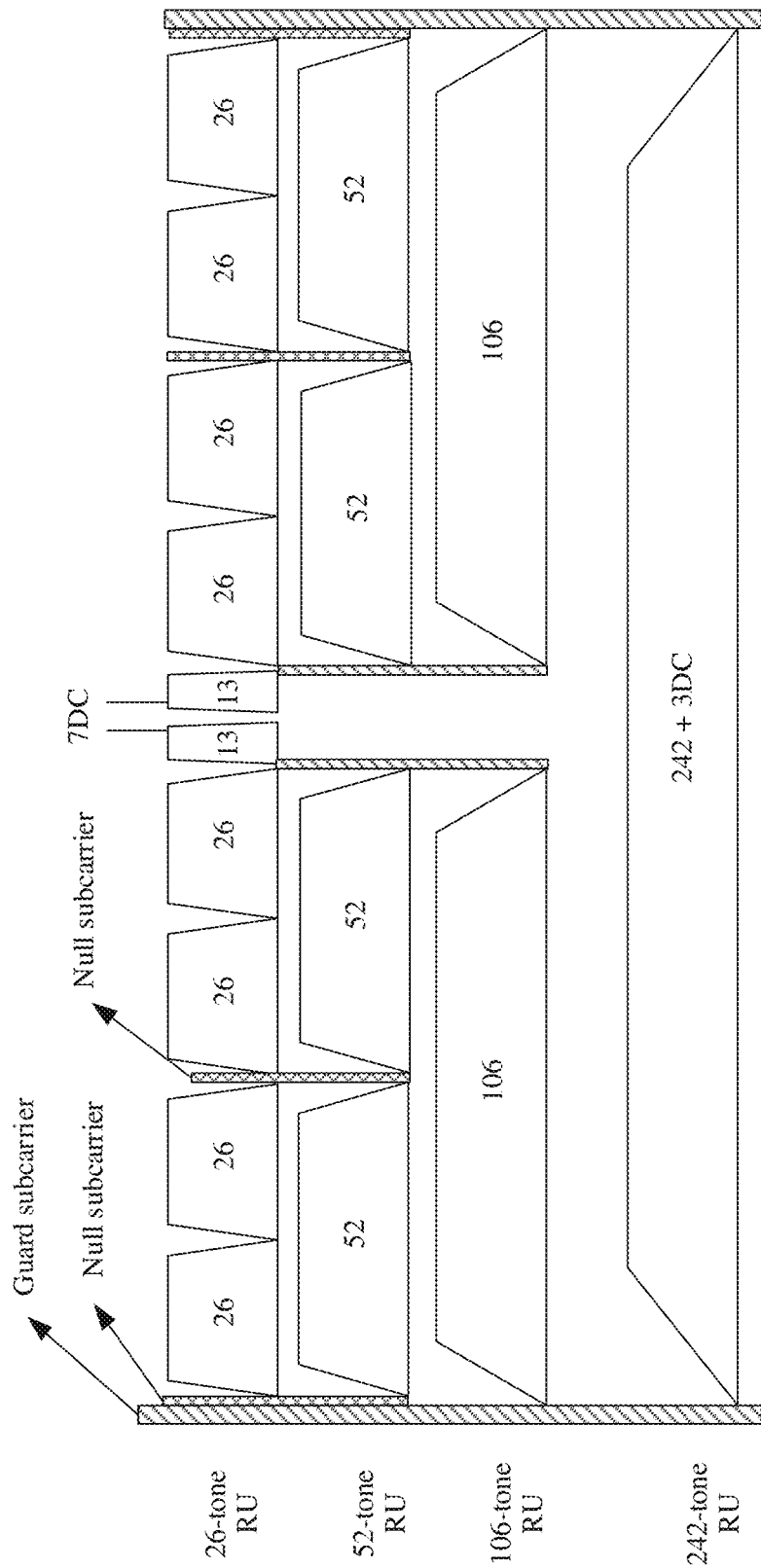
FIG. 3 is a schematic diagram of various arrangement and combination manners of resource units when a data packet bandwidth is 20 MHz.

When a data packet bandwidth is 20 MHz, FIG. 3 is a schematic diagram of a possible allocation manner of a resource unit when the data packet bandwidth is 20 MHz. The entire 20-MHz bandwidth may include an entire resource unit (242-tone RU) including 242 subcarriers, or may include various combinations of a resource unit (26-tone RU) including 26 subcarriers, a resource unit (52-tone RU) including 52 subcarriers, and a resource unit (106-tone RU) including 106 subcarriers. "Tone" may be understood as a subcarrier. In addition to RUs for transmitting data, there is a guard subcarrier, a null subcarrier, or a direct current (DC) subcarrier.

Figure 4:
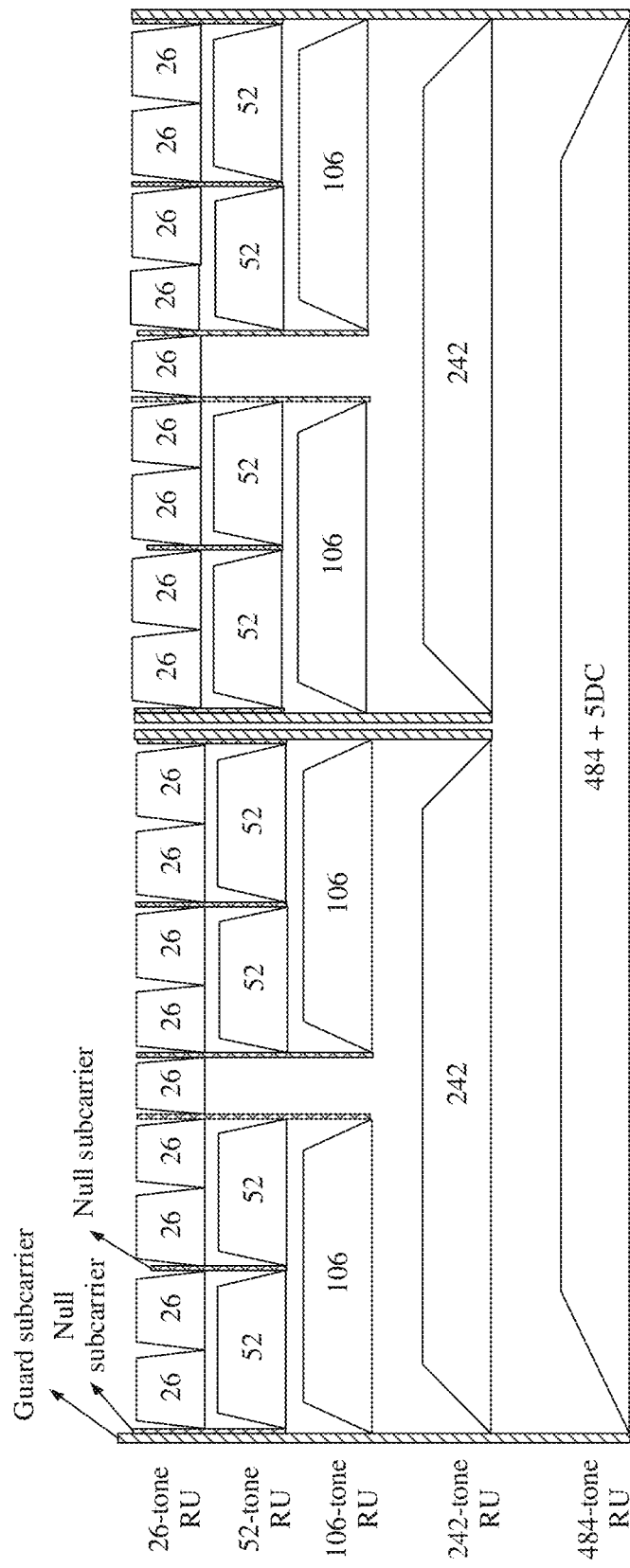
FIG. 4 is a schematic diagram of various arrangement and combination manners of resource units when a data packet bandwidth is 40 MHz.

When the data packet bandwidth is 40 MHz, FIG. 4 shows various allocation manners of a resource unit when the data packet bandwidth is 40 MHz. The entire bandwidth is roughly equivalent to a replication of subcarrier distribution of the 20-MHz bandwidth. The entire 40-MHz bandwidth may include an entire resource unit (484-tone RU) including 484 subcarriers, or may include various combinations of a 26-tone RU, a 52-tone RU, a 106-tone RU, and a 242-tone RU.

Figure 5:
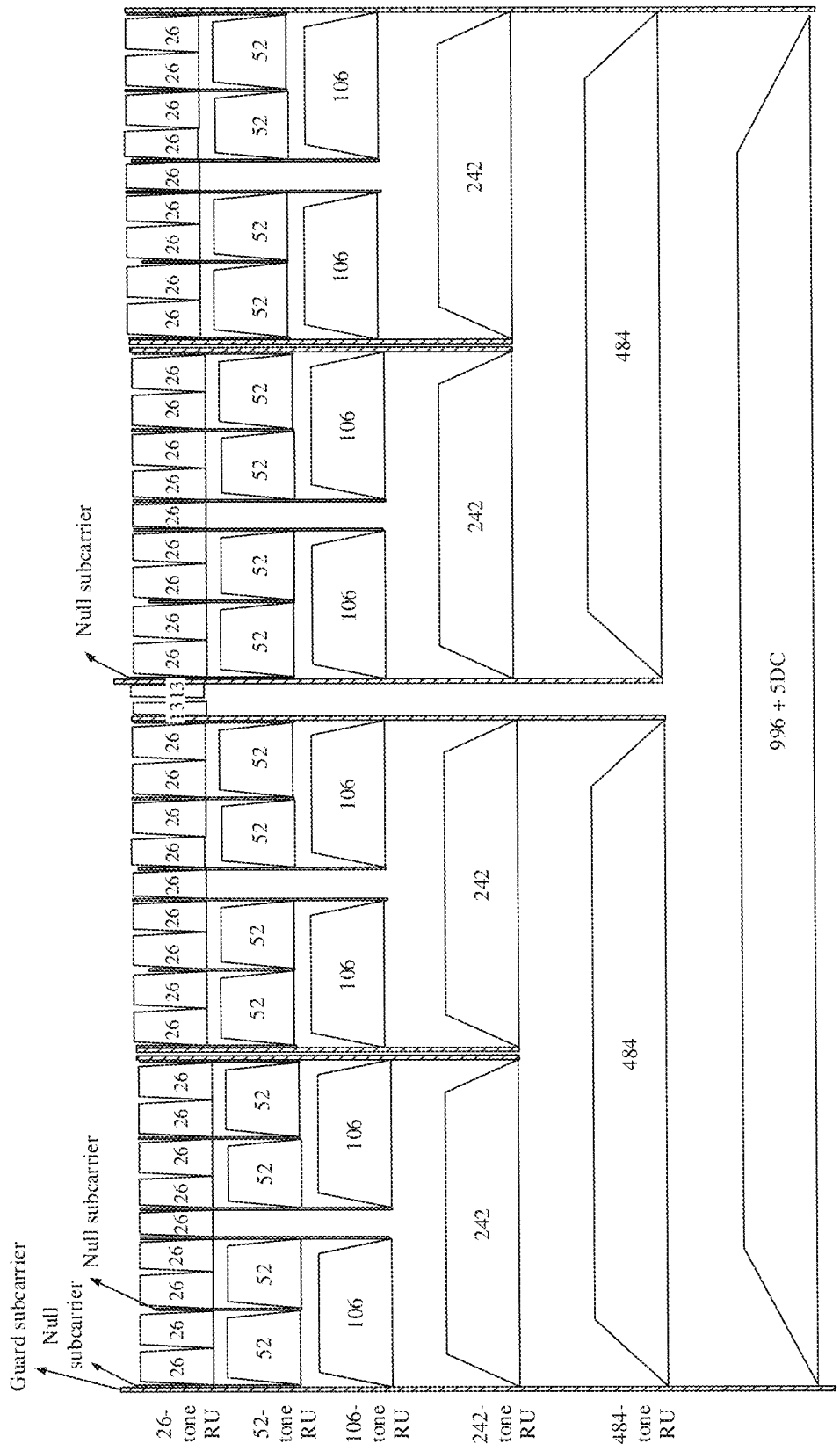
FIG. 5 is a schematic diagram of various arrangement and combination manners of resource units when a data packet bandwidth is 80 MHz.

When the data packet bandwidth is 80 MHz, FIG. 5 is a schematic diagram of a possible allocation manner of a resource unit when the data packet bandwidth is 80 MHz. The entire bandwidth is roughly equivalent to a replication of subcarrier distribution of the 20-MHz bandwidth. The entire 80-MHz bandwidth may include an entire resource unit (996-tone RU) including 996 subcarriers, or may include various combinations of a 484-tone RU, a 242-tone RU, a 106-tone RU, a 52-tone RU, and a 26-tone RU. In addition, there is a center 26-tone RU (Center 26-Tone RU) including two 13-tone subunits in the middle of the entire 80-MHz bandwidth.

Similarly, when the data packet bandwidth is 160 MHz, the entire bandwidth may be considered as a replication of subcarrier distribution of two 80-MHz bandwidths. The entire bandwidth may include an entire 2*996-tone RU (namely, a resource unit including 1992 subcarriers), or may include various combinations of a 26-tone RU, a 52-tone RU, a 106-tone RU, a 242-tone RU, a 484-tone RU, and a 996-tone RU. In addition, there is a center 26-tone RU including two 13-tone subunits in the middle of the entire 80-MHz bandwidth.

In the foregoing subcarrier distribution manners, on a basis of the 242-tone RU, a 242-tone RU on the left may be considered as a lowest frequency of the data packet bandwidth, and a 242-tone RU on the right may be considered as a highest frequency. FIG. 6 is used as an example. In this case, 242-tone RUs may be sequentially numbered 1, 2, 3, and 4 from left to right. For another example, when the data packet bandwidth is 160 MHz, the 242-tone RUs may be sequentially numbered 1, 2, . . . , and 8 from left to right. It should be understood that in a data field, the eight 242-tone RUs are in a one-to-one correspondence with eight 20-MHz channels in ascending order of frequencies. However, because there is a center 26-tone RU, the eight 242-tone RUs and the eight 20-MHz channels are not completely overlap in frequency.

A concept of a content channel (CC) is introduced into 802.11ax. The content channel may be understood as content included in the SIG-B field. For example, the content channel may include at least one resource unit allocation subfield (RU allocation subfield), a plurality of per station fields, the CRC used for check, and the tail subfield used for cyclic decoding. FIG. 6 is a schematic diagram of a structure of a content channel when a data packet bandwidth is 20 MHz. As shown in FIG. 6, when the data packet bandwidth is only 20 MHz, the SIG-B field includes only one content channel. The content channel includes one resource unit allocation subfield indicating an indication of resource unit allocation in a range of a first 242-tone RU of a data part. The one resource unit allocation subfield is one resource unit allocation index, and can used to indicate all possible allocation manners of resource units in one 242-tone RU. In addition, the index indicates a quantity of users for performing SU/MU-MIMO transmission in an RU whose size is greater than or equal to a 106-tone RU (namely, an RU including at least 106 subcarriers).

For example, it is assumed that the resource unit allocation subfield is an 8-bit index. All the possible allocation manners of the resource units in the one 242-tone RU may be indicated by using the 8-bit index. In addition, the 8-bit index indicates the quantity of users for performing SU/MU-MIMO transmission in the RU whose size is greater than or equal to the 106-tone RU (namely, the RU including at least 106 subcarriers). A resource unit index table of the 8-bit index is shown in Table 1.

unit, that is, different quantities of indexes correspond to a same resource unit arrangement manner. For the index $00111y_2y_1y_0$, eight entries exist because when a resource unit allocation manner of the 242-tone RU is indicated, $y_2y_1y_0$ further indicates a quantity of users, for performing SU/MU-MIMO transmission, included in the 106-tone RU, where the quantity corresponds to one to eight users. In other words, 3-bit $y_2y_1y_0$ indicates the one to eight users supported in the 106-tone RU. The eight entries may be considered as eight independent rows in the table. The eight rows correspond to a same resource unit allocation manner, and each row corresponds to different quantities of users supported by the 106-tone RU. In the 802.11ax standard, it is specified that MU-MIMO may be performed in an RU including at least 106 subcarriers. Therefore, when there is an RU

TABLE 1

| 8-bit index (B7 B6 B5 B4 B3 B2 B1 B0) | #1 | #2 | #3 | #4 | #5 | #6 | #7 | #8 | #9 | Quantity of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| $00010y_2y_1y_0$ | 52 | | 52 | | — | 106 | | | | 8 |
| $00011y_2y_1y_0$ | 106 | | | | — | 52 | | 52 | | 8 |
| $00100y_2y_1y_0$ | 26 | 26 | 26 | 26 | 26 | 106 | | | | 8 |
| $00101y_2y_1y_0$ | 26 | 26 | 52 | | 26 | 106 | | | | 8 |
| $00110y_2y_1y_0$ | 52 | | 26 | 26 | 26 | 106 | | | | 8 |
| $00111y_2y_1y_0$ | 52 | | 52 | | 26 | 106 | | | | 8 |
| $01000y_2y_1y_0$ | 106 | | | | 26 | 26 | 26 | 26 | 26 | 8 |
| $01001y_2y_1y_0$ | 106 | | | | 26 | 26 | 26 | 52 | | 8 |
| $01010y_2y_1y_0$ | 106 | | | | 26 | 52 | | 26 | 26 | 8 |
| $01011y_2y_1y_0$ | 106 | | | | 26 | 52 | | 52 | | 8 |
| $0110y_1y_0z_1z_0$ | 106 | | | | — | 106 | | | | 16 |
| 01110000 | 52 | | 52 | | — | 52 | | 52 | | 1 |
| 01110001 | 242-subcarrier resource unit empty (242-tone RU empty) | | | | | | | | | 1 |
| 01110010 | 484-tone RU with zero user fields indicated in this resource unit allocation subfield of the HE-SIG-B content channel (484-tone RU with zero user fields indicated in this RU allocation subfield of the HE-SIG-B content channel) | | | | | | | | | 1 |
| 01110011 | 996-tone RU with zero user fields indicated in this resource unit allocation subfield of the HE-SIG-B content channel (996-tone RU with zero user fields indicated in this RU allocation subfield of the HE-SIG-B content channel) | | | | | | | | | 1 |
| $011101x_1x_0$ | Reserved | | | | | | | | | 4 |
| $01111y_2y_1y_0$ | Reserved | | | | | | | | | 4 |
| $10y_2y_1y_0z_2z_1z_0$ | 106 | | | | 26 | 106 | | | | 64 |
| $11000y_2y_1y_0$ | 242 | | | | | | | | | 8 |
| $11001y_2y_1y_0$ | 484 | | | | | | | | | 8 |
| $11010y_2y_1y_0$ | 996 | | | | | | | | | 8 |
| $11011y_2y_1y_0$ | Reserved | | | | | | | | | 8 |
| $111x_4x_3x_2x_1x_0$ | Reserved | | | | | | | | | 32 |

In Table 1, a first column indicates the 8-bit index, and middle columns #1 to #9 indicate different resource units. A number in a cell indicates a quantity of subcarriers included in the resource unit. For example, the index $00111y_2y_1y_0$ indicates that the entire 242-tone RU is divided into four RUs: a 52-tone RU, a 52-tone RU, a 26-tone RU and a 106-tone RU. A quantity of entries in a third column indicates a quantity of entries allocated to a same resource unit, that is, different quantities of indexes correspond to a same resource unit arrangement manner. For the index including at least 106 subcarriers in a row in Table 2, a quantity of entries is greater than 1. Correspondingly, station information of allocated STAs in a range of the 242-tone RU is indicated in the per station field based on a sequence of a resource allocation.

Most RU configurations shown in Table 1 are in the range of the 242-tone RU. In addition, a few RU configurations indicate that the RU belongs to a 242-tone RU, a 484-tone RU, or a 996-tone RU. Every 8-bit resource unit allocation subfield notifies an RU allocation status in a range of a corresponding 20-MHz channel. It may be understood that a 20-MHz bandwidth corresponds to one resource unit allocation subfield, a 40-MHz bandwidth corresponds to two resource unit allocation subfields, an 80-MHz bandwidth corresponds to four resource unit allocation subfields, a 160-MHz bandwidth corresponds to eight resource unit allocation subfields, and a 320-MHz bandwidth corresponds to 16 resource unit allocation subfields.

FIG. 7 is a schematic diagram of a structure of a content channel when a data packet bandwidth is 40 MHz. As shown in FIG. 7, when the data packet bandwidth is 40 MHz, there are two SIG-B content channels: a CC 1 and a CC 2. A first SIG-B channel, namely, the CC 1, includes a resource unit allocation subfield and a corresponding per station field in a range of a first 242-tone RU. A second HE-SIG-B channel, namely, the CC 2, includes a resource unit allocation subfield and a corresponding per station field in a range of a second 242-tone RU.

FIG. 8 is a schematic diagram of a structure of a content channel when a data packet bandwidth is 80 MHz. As shown in FIG. 8, when the data packet bandwidth is 80 MHz, there are still two CCs, and there are four channels in total. Therefore, resource unit allocation information is indicated on the four channels based on a structure of a CC 1, a CC 2, a CC 1, and a CC 2 in ascending order of frequencies. The CC 1 includes resource unit allocation subfields in ranges of a first 242-tone RU and a third 242-tone RU and corresponding per station fields in the ranges of the first 242-tone RU and the third 242-tone RU. The CC 2 includes resource unit allocation subfields in ranges of a second 242-tone RU and a fourth 242-tone RU and corresponding per station fields in the ranges of the second 242-tone RU and the fourth 242-tone RU. In addition, each of the two CCs includes a center 26-tone RU indication field of the 80-MHz bandwidth, to indicate whether the resource unit is used to transmit data.

Similarly, when the data packet bandwidth is 160 MHz, there are still two CCs, and there are eight channels in total. This is equivalent to further expansion on the basis of the 80-MHz bandwidth.

In this embodiment of this application, combination of different RUs may be supported, and combination information of the RUs may be notified to user equipment by using a signal field. For example, the signal field may be a signal field B, an extremely high throughput signal (EHT-SIG) field, a signal field included in an EHT-SIG field, an EHT-SIG-B field, or another field included in a physical layer protocol data unit (PPDU). This is not limited in this application.

The following describes possible some combination statuses of RUs provided in this embodiment of this application.

For ease of description, there are two types of RUs: a small-size RU and a large-size RU. A set of small-size RUs is {26, 52, 106}, and a set of large-size RUs is {242, 484, 996}. A number in the set indicates a quantity of subcarriers forming the RU.

Optionally, in this embodiment of this application, the following RU combination rule may be set:
1: A small-size RU and a large-size RU are not combined;
2: small-size RUs are not combined across a 20-MHz channel; and
3: combination of small-size RUs should be continuous, and optionally, may alternatively be discontinuous.

In this embodiment of this application, a plurality of contiguous or discontiguous RUs are combined into a multi-RU. The plurality of contiguous or discontiguous RUs forming the multi-RU may be allocated to one or more users. Optionally, the plurality of contiguous or discontiguous RUs may be defined in 802.11ax, and a quantity of combined RUs is not limited. For example, combination of two small-size RUs within the 20-MHz channel in this embodiment of this application may also be understood as combination of two small-size RUs into one multi-RU.

Based on the foregoing rule, for combination of small-size RUs in the 20-MHz channel, possible combination manners of the small-size RUs include: a (52-tone RU+26-tone RU) manner, a (106-tone RU+26-tone RU) manner, and a (52-tone RU+106-tone RU) manner. In other words, there may be three types of multi-RUs included in the 20-MHz channel.

A first-type multi-RU is formed by combining one 52-tone RU and one 26-tone RU.

A second-type multi-RU is formed by combining one 106-tone RU and one 26-tone RU.

A third-type multi-RU is formed by combining one 52-tone RU and one 106-tone RU.

In addition, in this embodiment of this application, in the 20-MHz channel, during allocation, of frequency domain resource units, indicated by one RU allocation subfield, any one of the foregoing three types of multi-RUs may exist, or the first-type multi-RU and the second-type multi-RU may exist. In addition, a quantity of times that the first-type multi-RU exists (or a quantity of first-type multi-RUs) is not limited. For example, one or more first-type multi-RUs may exist. For example, it is assumed that in an allocation manner, of frequency domain resource units, indicated by an RU allocation subfield, two 52-tone RUs and at least two 26-tone RUs are included. In the allocation manner of the frequency domain resource units, two first-type multi-RUs may be included. One first-type multi-RU is formed by combining one 52-tone RU and one 26-tone RU, and the other first-type multi-RU is formed by combining the other 52-tone RU and another 26-tone RU.

For example, Table 2 shows a possible combination manner of small-size RUs within the 20-MHz channel.

TABLE 2

| #1 | #2 | #3 | #4 | #5 | #6 | #7 | #8 | #9 | Quantity of entries (Number of entries) |
|---|---|---|---|---|---|---|---|---|---|
| 26 | 26 | 26 | 26 | 26 | 26 | 26 | 52 (A) | | 1 |
| 26 | 26 | 26 | 26 | 26 | 52 (A) | | 26 | 26 | 1 |
| 26 | 26 | 26 | 26 | 26 | 52 (A, or) | | 52 (B, or) | | 1 |
| 26 | 26 | 52 (A) | | 26 | 26 | 26 | 26 | 26 | 1 |
| 26 | 26 | 52 (A, or) | | 26 | 26 | 26 | 52 (B, or) | | 1 |
| 26 | 26 | 52 (A, or) | | 26 | 52 (B, or) | | 26 | 26 | 1 |
| 26 | 26 | 52 (A, or) | | 26 | 52 (B, or) | | 52 (C, or) | | 1 |
| 52 (A) | | 26 | 26 | 26 | 26 | 26 | 26 | 26 | 1 |
| 52 (A, or) | | 26 | 26 | 26 | 26 | 26 | 52 (B, or) | | 1 |
| 52 (A, or) | | 26 | 26 | 26 | 52 (B, or) | | 26 | 26 | 1 |
| 52 (A, or) | | 26 | 26 | 26 | 52 (B, or) | | 52 (C, or) | | 1 |
| 52 (A, or) | | 52 (B, or) | | 26 | 26 | 26 | 26 | 26 | 1 |
| 52 (A, or) | | 52 (B, or) | | 26 | 26 | 26 | 52 (C, or) | | 1 |
| 52 (A, or) | | 52 (B, or) | | 26 | 52 (C, or) | | 26 | 26 | 1 |
| 52 (A) | | 52 | | 26 | 52 | | 52 | | 1 |
| 52 | | 52 | | — | 106 (D) | | | | 8 |
| 106 (D) | | | | — | 52 | | 52 | | 8 |
| 26 | 26 | 26 | 26 | 26 | 106 (E) | | | | 8 |
| 26 | 26 | 52 (A, or) | | 26 | 106 (E or D, or) | | | | 8 |
| 52 (A, or) | | 26 | 26 | 26 | 106 (E, or) | | | | 8 |
| 52 (A, or) | | 52 | | 26 | 106 (E or D, or) | | | | 8 |

TABLE 2-continued

| #1 | #2 | #3 | #4 | #5 | #6 | #7 | #8 | #9 | Quantity of entries (Number of entries) |
|---|---|---|---|---|---|---|---|---|---|
| 106 (E) | | | | 26 | 26 | 26 | 26 | 26 | 8 |
| 106 (E or D, or) | | | | 26 | 26 | 26 | 52 (A, or) | | 8 |
| 106 (E or D, or) | | | | 26 | 52 (A, or) | 26 | 26 | | 8 |
| 106 (E or D, or) | | | | 26 | 52 (A, or) | 52 | | | 8 |
| 106 (E) | | | | 26 | 106 | | | | 64 |

In Table 2, A indicates that one first-type multi-RU exists in the 20-MHz channel, that is, one 52-tone RU and one 26-tone RU are combined. B indicates that two first-type multi-RUs exist in the 20-MHz channel, that is, one 52-tone RU and one 26-tone RU are combined, and the other 52-tone RU and the other 26-tone RU are combined. C indicates that three first-type multi-RUs exist in the 20-MHz channel, that is, one 52-tone RU and one 26-tone RU are combined, another 52-tone RU and another 26-tone RU are combined, and still another 52-tone RU and still another 26-tone RU are combined. D indicates that one third-type multi-RU exists in the 20-MHz channel, that is, one 106-tone RU and one 56-tone RU are combined. E indicates that one second-type multi-RU exists in the 20-MHz channel, that is, one 106-tone RU and one 26-tone RU are combined.

"Or" in the table indicates that in a same resource unit allocation manner, only one of corresponding A to E can appear. For example, when the resource unit allocation manner is: a 52-tone RU, a 26-tone RU, a 26-tone RU, a 26-tone RU, a 26-tone RU, a 26-tone RU, and a 52-tone RU, (A, or) after the first 52-tone RU and (B, or) after the second 52-tone RU indicate that in this resource unit allocation manner, the following case of a multi-RU may exist: One first-type multi-RU is formed by combining any 26-tone RU and either of the two 52-tone RUs. In other words, there is one first-type multi-RU, and this is a combination manner A. Alternatively, one first-type multi-RU is formed by combining the first 52-tone RU and any 26-tone RU, and the other first-type multi-RU is formed by combining the second 52-tone RU and any other 26-tone RU. In other words, there are two first-type multi-RUs, and this is a combination manner B.

For another example, when the resource unit allocation manner is: a 52-tone RU, a 52-tone RU, a 26-tone RU, and a 106-tone RU, (A, or) after the first 52-tone RU and (E or D, or) after the 106-tone RU indicate that in this resource unit allocation manner, the following case of a multi-RU may exist: One first-type multi-RU is formed by combining one 26-tone RU and either of the two 52-tone RUs. In other words, there is one first-type multi-RU, and this is a combination manner A. Alternatively, one third-type multi-RU is formed by combining one i06-tone RU and either of the two 52-tone RUs. In other words, there is one third-type multi-RU, and this is a combination manner D. Alternatively, one second-type multi-RU is formed by combining one 106-tone RU and one 26-tone RU. In other words, there is one second-type multi-RU, and this is a combination manner E.

It should be understood that, in this embodiment of this application, locations of the 52-tone RU, the 106-tone RU, and the 26-tone RU in the foregoing combination manners are not limited in the first-type multi-RU, the second-type multi-RU, and the third-type multi-RU. In other words, the foregoing combination manner A merely indicates that there is one first-type multi-RU (a 52-tone RU+a 26-tone RU) in corresponding RU allocation, and locations of one 26-tone RU and one 52-tone RU are not limited. The foregoing combination manner B merely indicates that there are two first-type multi-RUs (a 52-tone RU+a 26-tone RU) and (a 52-tone RU+a 26-tone RU), and locations of the 26-tone RU and the 52-tone RU that are combined are not limited either. Similarly, the foregoing combination manner D merely indicates that there is one third-type multi-RU (a 106-tone RU+a 52-tone RU) in corresponding RU allocation, and locations of one 106-tone RU and one 52-tone RU that are combined are not limited either. The foregoing combination manner E merely indicates that there is one second-type multi-RU (a 106-tone RU+a 26-tone RU) in corresponding RU allocation, and locations of one 106-tone RU and one 26-tone RU that are combined are not limited either. In other words, a combination manner of small-size RUs shown in Table 2 is an unlimited combination manner, and locations of a 106-tone RU, a 26-tone RU, and a 52-tone RU that are combined are not limited.

Optionally, in some possible implementations of this application, when each 52-tone RU or 106-tone RU that is combinable is combined with a 26-tone RU, the following principle may be followed: The 52-tone RU or the 106-tone RU may be combined, within the 20-MHz channel, with a 26-tone RU that is closest to the 52-tone RU or the 106-tone RU. For example, a right 26-tone RU may be preferentially combined when a distance is the same, or a left 26-tone RU may be preferentially combined when the distance is the same. Alternatively, a left or right 26-tone RU is preferentially combined in a range of a left 106-tone RU or a left 52-tone RU when a distance is the same, and a right or left 26-tone RU is preferentially combined in a range of a right 106-tone RU or a right 52-tone RU when the distance is the same. For example, for the first-type multi-RU (a 52-tone RU+a 26-tone RU), the first-type multi-RU may be formed by combining a left or right 26-tone RU that is contiguous to one 52-tone RU with the 52-tone RU. For the second-type multi-RU (a 106-tone RU+a 26-tone RU), the second-type multi-RU may be formed by combining a left or right 26-tone RU that is contiguous to one 106-tone RU with the 106-tone RU. For the third-type multi-RU (a 106-tone RU+a 52-tone RU), the third-type multi-RU may be formed by combining a left or right 52-tone RU that is contiguous (or closest) to one 106-tone RU with the 106-tone RU. In other words, the foregoing combination manner of small-size RUs is a limited combination manner, and locations of a 106-tone RU, a 26-tone RU, and a 52-tone RU that are combined are limited to some extent.

For example, Table 3 shows another possible combination manner of small-size RUs within the 20-MHz channel according to this embodiment of this application.

TABLE 3

| #1 | #2 | #3 | #4 | #5 | #6 | #7 | #8 | #9 |
|---|---|---|---|---|---|---|---|---|
| 26 | 26 | 26 | 26 | 26 | 26 | 26 (a) | 52 (a) | |
| 26 | 26 | 26 | 26 | 26 | 52 (a) | | 26 (a) | 26 |
| 26 | 26 (a) | 52 (a) | | 26 | 26 | 26 | 26 | 26 |
| 26 | 26 (a) | 52 (a) | | 26 | 26 | 26 (b) | 52 (b) | |
| 26 | 26 (a) | 52 (a) | | 26 | 52 (b) | | 26 (b) | 26 |
| 26 | 26 (a) | 52 (a) | | 26 | 52 | | 52 | |
| 52 (a) | | 26 (a) | 26 | 26 | 26 | 26 | 26 | 26 |
| 52 (a) | | 26 (a) | 26 | 26 | 26 | 26 (b) | 52 (b) | |
| 52 (a) | | 26 (a) | 26 | 26 | 52 (b) | | 26 (b) | 26 |
| 52 (a) | | 26 (a) | 26 | 26 (b) | 52 (b) | | 52 (C, or) | |
| 52 | | 52 (a) | | 26 (a) | 26 | 26 | 26 | 26 |
| 52 | | 52 (a) | | 26 (a) | 26 | 26 (b) | 52 (b) | |
| 52 | | 52 (a) | | 26 (a) | 52 (b) | | 26 (b) | 26 |
| 52 | | 52 (a) | | 26 (a) | 52 | | 52 | |

TABLE 3-continued

| #1 | #2 | #3 | #4 | #5 | #6 | #7 | #8 | #9 |
|---|---|---|---|---|---|---|---|---|
| 26 | 26 | 26 | 26 | 26 (a) | 106 (a) | | | |
| 26 | 26 (a) | 52 (a) | | 26 (b) | 106 (b) | | | |
| 52 (a) | | 26 (a) | 26 | 26 (b) | 106 (b) | | | |
| 52 | | 52 | | 26 (a) | 106 (a) | | | |
| 106 (a) | | | | 26 (a) | 26 | 26 | 26 | 26 |
| 106 (a) | | | | 26 (a) | 26 | 26 (b) | 52 (b) | |
| 106 (a) | | | | 26 (a) | 52 (b) | | 26 (b) | 26 |
| 106 (a) | | | | 26 (a) | 52 | | 52 | |
| 106 (a) | | | | 26 (a) | 106 | | | |
| | | | | 26 (a) | 106 (a) | | | |

In Table 3, for distribution of subcarriers in any row, a multi-RU may be obtained by combining RUs numbered (a), and a multi-RU may be obtained by combining RUs numbered (b). In addition, in same RU allocation, an RU combination in a manner (a) and an RU combination in a manner (b) may coexist.

For another example, Table 4 shows another possible combination manner of a 52-tone RU and a 106-tone RU within the 20-MHz channel according to this embodiment of this application.

TABLE 4

| #1 | #2 | #3 | #4 | #5 | #6 | #7 | #8 | #9 |
|---|---|---|---|---|---|---|---|---|
| 26 | 26 | 52 (c) | | 26 | 106 (c) | | | |
| 52 (c) | | 26 | 26 | 26 | 106 (c) | | | |
| 52 (c) | | 52 | | 26 | 106 (c) | | | |
| 52 | | 52 (c) | | 26 | 106 (c) | | | |
| 106 (c) | | | | 26 | 26 | 26 | 52 (c) | |
| 106 (c) | | | | 26 | 52 (c) | | 26 | 26 |
| 106 (c) | | | | 26 | 52 (c) | | 52 | |
| 106 (c) | | | | 26 | 52 | | 52 (c) | |

In Table 4, for distribution of subcarriers in any row, a multi-RU may be obtained by combining RUs numbered (c).

It should be understood that, in this embodiment of this application, there may be another possible combination manner of small-size RUs within the 20-MHz channel. Table 2 to Table 4 merely list some possible RU combination manners as examples. However, no limitation should be imposed on the combination manner of small-size RUs within the 20-MHz channel in this embodiment of this application.

It should be further understood that Table 3 and Table 4 show limited combination manners of small-size RUs.

For a combination manner of large-size RUs, the following separately uses an 80-MHz bandwidth, a 160-MHz bandwidth, and a 320-MHz bandwidth as examples for description. Combination of large-size RUs across a 242-tone RU in this embodiment of this application may also be understood as combination of a plurality of large-size RUs into one multi-RU. If there is a case of preamble puncturing on a channel, the combination manner of large-size RUs may be used to combine a plurality of RUs that are not punctured and allocate the combined plurality of RUs to one or more users. This improves RU allocation flexibility and spectrum utilization.

In a possible RU combination manner of an 80-MHz bandwidth shown in Table 5, the 80-MHz bandwidth corresponds to four resource unit allocation subfields, and one resource unit allocation subfield indicates one 242-tone RU. The four resource unit allocation subfields are sequentially arranged on two CCs in sequence. Locations in Table 5 indicate sequential locations of four 242-tone RUs indicated by the four resource unit allocation subfields. As shown in Table 5, different combination manners separately indicate that two corresponding large-size RUs are combined into one multi-RU. In other words, there are five different types of multi-RUs in total included in the 80-MHz bandwidth. Different combination manners in Table 5 separately indicate different multi-RUs. It can be learned that the 80-MHz bandwidth may include two types of multi-RUs: (a 242-tone RU+a 242-tone RU) and (a 484-tone RU+a 242-tone RU).

TABLE 5

| | Location | | | |
|---|---|---|---|---|
| Combination manner | 242-tone RU | 242-tone RU | 242-tone RU | 242-tone RU |
| 1 | 242-tone RU | | | 242-tone RU |
| 2 | | 484-tone RU | 242-tone RU | |
| 3 | | 484-tone RU | | 242-tone RU |
| 4 | 242-tone RU | | 484-tone RU | |
| 5 | | 242-tone RU | 484-tone RU | |

Because the 160-MHz bandwidth corresponds to eight resource unit allocation subfields, and one resource unit allocation subfield indicates one 242-tone RU, for the 160-MHz bandwidth, there may be the following types of multi-RUs including two or more large-size RUs: (a 996-tone RU+a 996-tone RU), (a 242-tone RU+a 484-tone RU), (a 242-tone RU+a 484-tone RU+a 484-tone RU), (a 242-tone RU+a 484-tone RU+a 242-tone RU), (a 484-tone RU+a 996-tone RU), and (a 996-tone RU+a 484-tone RU). Each pair of brackets indicates one type of multi-RU.

For example, Table 6 shows a possible RU combination manner of the 160-MHz bandwidth provided in this embodiment of this application. The 160-MHz bandwidth corresponds to eight resource unit allocation subfields, and one resource unit allocation subfield indicates one 242-tone RU. The 160-MHz bandwidth shown in Table 6 may include two 996-tone RUs. Locations in Table 6 indicate sequential locations of the two 996-tone RUs. As shown in Table 6, different combination manners separately indicate that a plurality of corresponding large-size RUs are combined into one multi-RU.

TABLE 6

| | Location | | |
|---|---|---|---|
| Combination manner | One 996-tone RU | | The other 996-tone RU |
| 1 | 242-tone RU | 242-tone RU | 996-tone RU |
| 2 | 242-tone RU | 484-tone RU | 996-tone RU |
| 3 | 484-tone RU | 242-tone RU | 996-tone RU |
| 4 | 242-tone RU | 242-tone RU | 996-tone RU |
| 5 | 484-tone RU | | 996-tone RU |
| 6 | | 484-tone RU | 996-tone RU |
| 7 | 484-tone RU | 242-tone RU | 242-tone RU  484-tone RU |

It should be understood that Table 6 is merely an example, and should not impose any limitation on the RU combination manner of the 160-MHz bandwidth.

A combination group in the 320-MHz bandwidth may be combination based on the foregoing 160-MHz bandwidth, may be combination based on the foregoing 80-MHz bandwidth, or the like. For example, Table 7 shows an RU combination manner that may exist in the 320-MHz bandwidth according to this embodiment of this application. As shown in Table 7, different combination manners separately indicate that two corresponding large-size RUs are combined into one multi-RU.

TABLE 7

| Combination manner | Location | | | |
|---|---|---|---|---|
| | 996-tone RU | 996-tone RU | 996-tone RU | 996-tone RU |
| 1 | 996-tone RU | | | 996-tone RU |
| 2 | 996-tone RU | | 996-tone RU | |
| 3 | 996-tone RU | | 996-tone RU | 996-tone RU |
| 4 | 996-tone RU | 996-tone RU | | |
| 5 | 996-tone RU | 996-tone RU | | 996-tone RU |
| 6 | 996-tone RU | 996-tone RU | 996-tone RU | |

It should be understood that Table 5 to Table 7 are merely some examples of the combination manner of large-size RUs across a 242-tone RU in this embodiment of this application, and should not impose any limitation on the combination manner of large-size RUs across a 242-tone RU in this embodiment of this application. In addition, Table 5 to Table 7 show only limited combination manners of large-size RUs, and a quantity, locations, combinations, and the like of large-size RUs that need to be combined are all limited to some extent. In other words, combinations, locations, and the like of the large-size RUs that can be combined are predefined.

Figure 9:
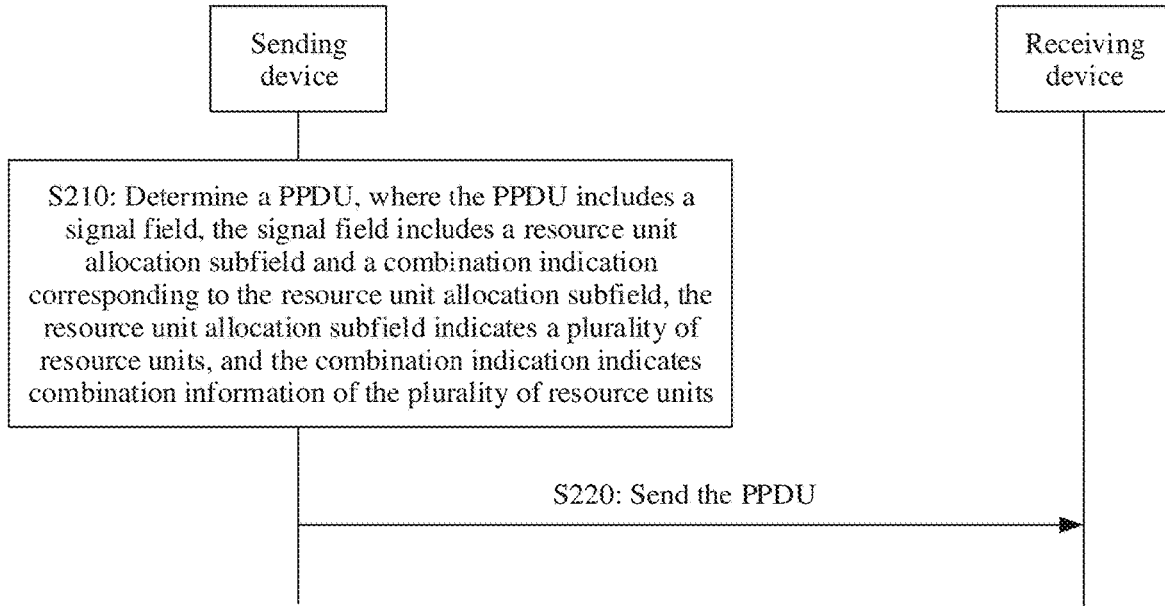
FIG. 9 is a schematic interaction diagram of a resource unit combination indication method according to an embodiment of this application.

The following describes in detail a resource unit combination indication method provided in this application with reference to FIG. 9. FIG. 9 is a schematic flowchart of a resource unit combination indication method 200 according to an embodiment of this application. The method 200 may be applied to the scenario shown in FIG. 1. Certainly, the method may also be applied to another communications scenario or communications system. This is not limited in this embodiment of this application.

It should be understood that, in the following description, methods in embodiments are described by using an example in which a sending device and a receiving device are used as execution bodies for performing the methods in embodiments. The sending device may be the foregoing AP or STA, and the receiving device may also be the foregoing AP or STA. As an example but not a limitation, the method may be performed by chips applied to a sending device and a receiving device.

As shown in FIG. 9, the method 200 may include step S210 and step S220. The following describes steps in the method 200 in detail with reference to FIG. 9. The method 200 includes the following steps.

S210: A sending device determines a PPDU, where the PPDU includes a signal field, the signal field includes at least one resource unit allocation subfield and a combination indication corresponding to the at least one resource unit allocation subfield, one resource unit allocation subfield corresponds to allocation of frequency domain resource units of one 20-MHz channel, one resource unit subfield indicates sizes and locations of a plurality of resource units included in the 20-MHz channel, the signal field further includes a combination indication, and the combination indication indicates combination information, of resource units, indicated by the at least one resource unit allocation subfield. In other words, the signal field includes a resource unit allocation subfield and a combination indication corresponding to the resource unit allocation subfield, the resource unit allocation subfield indicates a plurality of resource units, and the combination indication indicates combination information of the plurality of resource units.

One resource unit allocation subfield may indicate a plurality of resource units included in frequency domain of the 20-MHz channel, and the plurality of resource units are all small-size RUs. In this case, a combination indication corresponding to one resource unit allocation subfield indicates a combination status of small-size RUs in frequency domain of one 20-MHz channel.

S220: The sending device sends the PPDU. Correspondingly, a receiving device receives the PPDU.

Specifically, in S210, when the sending device needs to send data to the receiving device, the sending device sends the PPDU to the receiving device, where the PPDU includes the signal field (SIG). Optionally, the signal field may be the foregoing EHT-SIG-B field. In addition to the signal field, the PPDU may further include an EHT-SIG-A field, a data field, and the like. The signal field includes the at least one resource unit allocation subfield (RU allocation subfield). The signal field may further include at least one station field (User Field). The one resource unit allocation subfield corresponds to the allocation of the frequency domain resource units of the 20-MHz channel, and the one resource unit subfield indicates the sizes and the locations of the plurality of resource units included in the 20-MHz channel. A sequence of the at least one station field corresponds to a sequence of an allocation of resource units. Each station field indicates station information of an allocated STA in an RU included in resource unit allocation. In addition, the signal field further includes the combination indication (or may also be referred to as a combination indication bit), and the combination indication indicates the combination information, of the resource units, indicated by the at least one resource unit allocation subfield. In S220, after receiving the PPDU, the receiving device may determine the combination information of the RUs based on the signal field and the indication bit, to determine a plurality of RUs corresponding to the receiving device. This improves RU allocation flexibility of a system, and improves spectrum utilization of the system.

Figure 10:
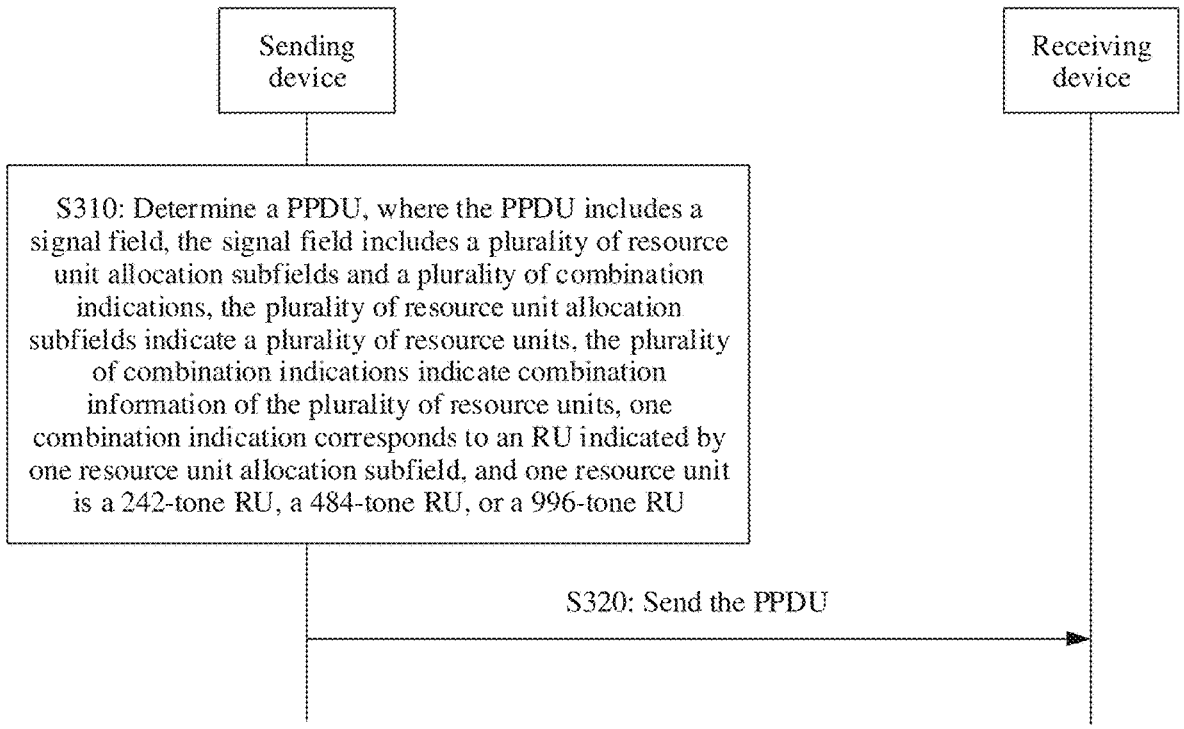
FIG. 10 is a schematic interaction diagram of another resource unit combination indication method according to an embodiment of this application.

FIG. 10 is a schematic interaction diagram of another example of a resource unit combination indication method 300 according to this application. The method 300 may include step S310 and step S320. The following describes steps in the method 300 in detail with reference to FIG. 10. The method 300 includes the following steps.

S310: A sending device generates a PPDU, where the PPDU includes a signal field, the signal field includes a plurality of resource unit allocation subfields and combination indications corresponding to the plurality of resource unit allocation subfields, one resource unit allocation subfield corresponds to allocation of frequency domain resource units of one 20-MHz channel, one resource unit subfield indicates a size and a location of one resource unit included in the 20-MHz channel, and the one resource unit is a large-size RU, which is a 242-tone RU, a 484-tone RU, or a 996-tone RU. The plurality of resource unit allocation subfields indicate a plurality of resource units. The signal field further includes the combination indications, the plurality of combination indications indicate combination information of the plurality of resource units, and one combination indication corresponds to an RU indicated by one resource unit allocation subfield. In other words, the plurality of combination indications indicate combination information of a plurality of large-size RUs. The signal field includes the plurality of resource unit allocation subfields and the plurality of combination indications, the plurality of resource unit allocation subfields indicate the plurality of resource units, the plurality of combination indications indicate the combination information of the plurality of resource units, the one combination indication corresponds to the RU indicated by the one resource unit allocation subfield, and the one resource unit is the 242-tone RU, the 484-tone RU, or the 996-tone RU.

S320: The sending device sends the PPDU. Correspondingly, a receiving device receives the PPDU.

Specifically, in S310, when the sending device needs to send data to the receiving device, the sending device sends the PPDU to the receiving device, where the PPDU includes the signal field (SIG). Optionally, the signal field may be the foregoing EHT-SIG-B field. In addition to the signal field, the PPDU may further include an EHT-SIG-A field, a data field, and the like. The signal field includes at least one resource unit allocation subfield (RU allocation subfield). The signal field may further include at least one station field (User Field). One resource unit allocation subfield corresponds to allocation of frequency domain resource units of one 20-MHz channel, and one resource unit subfield indicates a size and a location of one large-size RU included in the 20-MHz channel. The large-size RU is the 242-tone RU, the 484-tone RU, or the 996-tone RU, and a sequence of the at least one station field corresponds to a sequence of an allocation of resource units. Each station field indicates station information of an allocated STA in an RU included in resource unit allocation. In addition, the signal field further includes the combination indication (or may also be referred to as a combination indication bit), and the combination indication indicates the combination information, of the plurality of resource units, indicated by the plurality of resource unit allocation subfields. In other words, the combination indication indicates combination of large-size RUs across a 242-tone RU. In S320, after receiving the PPDU, the receiving device may determine the combination information of the large-size RUs based on the signal field and the indication bit, to determine a plurality of large-size RUs corresponding to the receiving device. This improves RU allocation flexibility of a system, and improves spectrum utilization of the system.

Description is separately provided below.

In some possible implementations of this application, each resource unit allocation subfield may be extended. For example, extension is performed after an existing resource unit allocation subfield, and a bit may be added after any one or more existing resource unit allocation subfields, to indicate combination information, of resource units, indicated by the resource unit allocation subfield. For example, each resource unit allocation subfield includes a combination indication. The combination indication indicates combination information, of resource units, indicated by the resource unit allocation subfield.

For example, as shown in Table 1, in this embodiment of this application, extension may be performed after an 8-bit-index resource unit allocation subfield in Table 1, to extend the 8-bit-index resource unit allocation subfield to 9 bits, 10 bits, or more bits. One or more extended bits indicate a combination status of the resource units indicated by the resource unit allocation subfield, that is, the one or more extended bits are a combination indication, and the combination indication may indicate combination of the resource units indicated by the resource unit allocation subfield, including combination of small-size RUs within a 242-tone RU and combination of large-size RUs across a 242-tone RU.

For the combination of small-size RUs within a 242-tone RU, it can be learned from the foregoing analysis that a maximum of three multi-RUs exist in one 20-MHz channel. The three multi-RUs are three first-type multi-RUs, that is, there are three multi-RUs in a form of (a 52-tone RU+a 26-tone RU). Therefore, 2 bits may be used for indication, so that zero to three multi-RUs can be indicated. In this way, the 8-bit-index resource unit allocation subfield in Table 1 may be extended to 10 bits, where the $9^{th}$ bit and the $10^{th}$ bit are the foregoing combination indication.

For example, in a possible implementation, one resource unit allocation subfield in the plurality of resource unit allocation subfields corresponds to allocation of frequency domain resource units of one 20-MHz channel and a combination status of the resource units. The one resource unit allocation subfield indicates a size and a location of one or more resource units included in the 20-MHz channel, and the combination status of the resource units. The resource unit allocation subfield includes a plurality of bits. Some bits indicate the allocation of the frequency domain resource units of the 20-MHz channel, namely, the size and the location of the one or more resource units, and the other bits indicate the combination status of the frequency domain resource units of the 20-MHz channel. For example, the resource unit allocation subfield includes 10 bits, where the first 8 bits indicate resource unit allocation, and the last 2 bits indicate a combination status of frequency domain resource units in the resource unit allocation. Optionally, for a resource unit allocation manner indicated by the first 8 bits, refer to a design in an HE-SIG-B in 802.11ax, for example, Table 1. Certainly, it should be noted that, in a case in which the 20-MHz channel includes an RU including at least 106 tones, because the RU including at least 106 tones may be used for MU-MIMO transmission, some of the 8 bits may further indicate a quantity of users who perform MU-MIMO transmission in the RU including at least 106 tones. The last 2 bits may also be referred to as a combination indication, and when the combination indication bits are set to 00, 01, 10, and 11, it may separately indicate different combination statuses. For example, when the 2 bits are set to 00, it indicates that there is no multi-RU combination in the resource unit allocation manner, that is, there is no multi-RU. When the 2 bits are set to 01, it indicates that there is one multi-RU in the resource unit allocation manner. The one multi-RU may be a first-type multi-RU (a 52-tone RU+a 26-tone RU), a second-type multi-RU (a 106-tone RU+a 26-tone RU), or a third-type multi-RU (a 52-tone RU+a 106-tone RU). When the 2 bits are set to 10, it indicates that there are two multi-RUs in the resource unit allocation manner. The two multi-RUs may be two first-type multi-RUs, or one first-type multi-RU and one second-type multi-RU (a 106-tone RU+a 26-tone RU). When the 2 bits are set to 11, it indicates that there are three multi-RUs in the resource unit allocation manner. All the three multi-RUs are first-type multi-RUs (a 52-tone RU+a 26-tone RU).

Optionally, in this embodiment of this application, for a multi-RU indicated by the combination indication, locations of small-size RUs forming the multi-RU may be predefined. For example, when the 2 bits are set to 01, if the first-type multi-RU is indicated, it indicates by default that in one resource unit allocation manner, a first 52-tone RU from left to right and a first 26-tone RU on the left or right of the 52-tone RU (or a 26-tone RU contiguous to the 52-tone RU) are combined to obtain the first-type multi-RU. Similarly, if the second-type multi-RU is indicated, it indicates by default that in one resource unit allocation manner, a first 106-tone RU from left to right and a first 26-tone RU on the left or right of the 106-tone RU (or a 26-tone RU contiguous to the 106-tone RU) are combined to obtain the second-type multi-RU. If the third-type multi-RU is indicated, it indicates by default that in one resource unit allocation manner, a first 106-tone RU from left to right and a first 52-tone RU on the left or right of the 106-tone RU (or a 52-tone RU contiguous to the 106-tone RU) are combined to obtain the third-type multi-RU.

When the 2 bits are set to 10, if the two first-type multi-RUs are indicated, locations of a 52-tone RU and a 26-tone RU included in each first-type multi-RU may be predefined. When the 2 bits are set to 10, if the one first-type multi-RU and the one second-type multi-RU (a 106-tone RU+a 26-tone RU) are indicated, locations of RUs included in the first-type multi-RU and the second-type multi-RU may also be determined based on a predefined rule. For example, a 106-tone RU and a 52-tone RU are respectively combined with a 26-tone RU that is closest to the 106-tone RU and a 26-tone RU that is closest to the 52-tone RU, to obtain the one first-type multi-RU and the one second-type multi-RU. When the 2 bits are set to 11, a location of a 26-tone RU included in each of the three first-type multi-RUs may also be determined based on the foregoing predefined rule.

In other words, in this embodiment of this application, the foregoing three types of multi-RUs each may further indicate a location relationship between two included small-size RUs. To be specific, locations of two small-size RUs included in different types of multi-RUs may be further determined based on the different types of multi-RUs. In other words, in this embodiment of this application, in addition to indicating a quantity of multi-RUs in the resource unit allocation manner, the combination indication may further indicate a location relationship between two small-size RUs included in each multi-RU. In other words, the combination indication indicates a limited combination manner of small-size RUs.

In some other possible implementations of this application, when the 2 bits are set to 00, it indicates that there is no multi-RU combination in the resource unit allocation manner, that is, there is no multi-RU. When the 2 bits are set to another value, it indicates that there is one 52-tone RU in the resource unit allocation manner. For example, when the 2 bits are set to 01, it indicates that in the resource unit allocation manner, a first 52-tone RU or a first 106-tone RU from the left and a contiguous or neighboring 26-tone RU are combined. When the 2 bits are set to 10, it indicates that a second 52-tone RU from the left and a contiguous or neighboring 26-tone RU are combined. When the 2 bits are set to 11, it indicates that a third 52-tone RU from the left and a contiguous or neighboring 26-tone RU are combined. The 26-tone RU that is contiguous to or neighboring to the 52-tone RU or the 106-tone RU may be understood as the first 26-tone RU on the left or right of the 52-tone RU or the 106-tone RU. In other words, in addition to indicating a quantity of multi-RUs in the resource unit allocation manner, the combination indication may further indicate a location relationship between two small-size RUs included in each multi-RU.

For the combination of small-size RUs within a 242-tone RU, the combination indication may alternatively be 1 bit. For example, the resource unit allocation subfield includes 9 bits, where the first 8 bits indicate resource unit allocation, and the last 1 bit indicates a combination status of frequency domain resource units of one 20-MHz channel. To be specific, the 8-bit-index resource unit allocation subfield is extended to 9 bits, where the $9^{th}$ bit is the foregoing combination indication. In this case, for example, when the 1 bit is set to 0, it indicates that there is no multi-RU combination in the resource unit allocation manner, that is, there is no multi-RU. When the 1 bit is set to 1, it indicates that there is one multi-RU in the resource unit allocation manner. The one multi-RU may be a first-type multi-RU (a 52-tone RU+a 26-tone RU), a second-type multi-RU (a 106-tone RU+a 26-tone RU), or a third-type multi-RU (a 52-tone RU+a 106-tone RU). Locations of two RUs included in one multi-RU may be predefined. For example, a first 52-tone RU or a first 106-tone RU from the left and a 26-tone RU that is contiguous (or closest) to the first 52-tone RU or the first 106-tone RU may be combined. In other words, in addition to indicating a quantity of multi-RUs in the resource unit allocation manner, the combination indication may further indicate a location relationship between two small-size RUs included in each multi-RU.

For the combination of large-size RUs across a 242-tone RU, a 2-bit combination indication may alternatively indicate three different multi-RUs. Each multi-RU includes two or more large-size RUs. For example, the 8-bit-index resource unit allocation subfield is extended to 10 bits, where the first 8 bits indicate a size, a location, and the like of a resource unit, the last 2 bits indicate a combination status of the resource unit, and the $9^{th}$ bit and the $10^{th}$ bit are the foregoing combination indication.

In a possible implementation, when the 2 bits are set to 00, it indicates that a large-size RU indicated by the resource unit allocation subfield is not combined, that is, is not combined with another large-size RU. When the 2 bits are set to 01, 10, and 11, it separately indicates a combination type different from a combination type of the large-size RU indicated by the resource unit allocation subfield. For example, Table 8 shows an example of large-size RU combination manners indicated by different values of the combination indication.

TABLE 8

| Large-size RUs indicated by different resource unit allocation subfields | 242-tone RU | 242-tone RU | 242-tone RU | 242-tone RU | 996-tone RU | 484-tone RU | 242-tone RU | 242-tone RU | 996-tone RU |
|---|---|---|---|---|---|---|---|---|---|
| Values of combination indication bits in different resource unit allocation subfields | 01 | 00 | 00 | 01 | 01 | 11 | 11 | 00 | 00 |

Each RU in a first row in Table 8 indicates a large-size RU (namely, an RU allocation manner in a bandwidth) indicated by one resource unit allocation subfield. It is assumed that the signal field includes the resource unit allocation subfield corresponding to the large-size RU shown in Table 8. For a combination indication in each resource unit, when the combination indication bit is set to 00, it indicates that the large-size RUs indicated by the resource unit allocation subfield are not combined. When the combination indication bit is set to 01, it indicates one type of RU combination, and large-size RUs corresponding to the value 01 of the combination indication bit are combined to obtain one multi-RU. When the combination indication bit is set to 11, it indicates one type of combination, and large-size RUs corresponding to the value 11 of the combination indication bit are combined to obtain one multi-RU. When the combination indication bit is set to 10, it may also indicate one type of combination, and large-size RUs corresponding to the value 10 of the combination indication bit are combined to obtain predefined, and the combination indication may indicate any one of the plurality of combination groups of large-size RUs.

In another possible implementation, different values of the 2-bit combination indication may alternatively indicate different sequences of large-size RUs during resource unit combination. For example, when the 2 bits are set to 00, it indicates that the large-size RUs indicated by the resource unit allocation subfield are not combined; and when the 2 bits are set to 01, 10, and 11, it indicates that the large-size RUs that need to be combined are separately located at the beginning, in the middle, and at the end of combination locations. For example, Table 9 shows an example of an RU combination manner indicated by a value of a combination indication bit.

TABLE 9

| Large-size RUs indicated by different resource unit allocation subfields | 242-tone RU | 242-tone RU | 242-tone RU | 242-tone RU | 996-tone RU | 484-tone RU | 242-tone RU | 242-tone RU | 996-tone RU |
|---|---|---|---|---|---|---|---|---|---|
| Values of combination indication bits in different resource unit allocation subfields | 01 | 00 | 00 | 10 | 11 | 01 | 11 | 00 | 00 | one multi-RU. Therefore, there are two multi-RUs shown in Table 8. One multi-RU is (a 242-tone RU+a 242-tone RU+a 996-tone RU), and the other multi-RU is (a 484-tone RU+a 242-tone RU). In other words, a resource unit corresponding to another combination indication with a same value as a combination indication bit is combined with a resource unit corresponding to the combination indication, to obtain one multi-RU. It should be understood that, in Table 8, one 996-tone RU corresponds to four RU allocation subfields, and values of combination indications in all the RU allocation subfields are the same, for example, all are 11 or 01. One 484-tone RU corresponds to two RU allocation subfields, and values of combination indications in all the RU allocation subfields are the same, for example, both are 11.

It should be further understood that, when different values of the 2-bit combination indication indicate different combination types of large-size RUs, if a combination indication corresponding to a small-size RU appears between combination indications corresponding to the large-size RUs, the combination indication corresponding to the small-size RU does not affect combination of the large-size RUs. In other words, in a case in which the combination indication corresponding to the small-size RU appears between the large-size RUs, the combination indication corresponding to the small-size RU may be skipped or not read.

It should be understood that, in this embodiment of this application, for the combination of large-size RUs across a 242-tone RU, a quantity of large-size RUs that can be combined may be predefined or configured. Further, a combination group, a combination manner, or the like of large-size RUs may be predefined or configured. When the 2-bit combination indication indicates large-size RU combination, it may indicate that more (for example, three or five) large-size RUs are combined to obtain one multi-RU. In other words, the combination indication may further indicate a predefined combination manner of a plurality of large-size RUs, that is, the combination indication indicates a limited combination manner of large-size RUs. Locations and sequences of the to-be-combined large-size RUs are limited to some extent. For example, a plurality of combination groups of large-size RUs that can be combined may be In the example shown in Table 9, because a bit value "00" exists between a bit value "01" and a bit value "10", a large-size RU corresponding to the bit value "00" may be skipped, and bit values "10" and "11" continue to be read. When the bit value "11" is read, a large-size RU corresponding to the bit value "11" is a last large-size RU included in a multi-RU. A large-size RU corresponding to the bit value "10" is a first large-size RU included in the multi-RU. In the example shown in Table 9, it may be determined that there are two multi-RUs. One multi-RU is (a 242-tone RU+a 242-tone RU+a 996-tone RU), and the other multi-RU is (a 484-tone RU+a 242-tone RU). It should be understood that, in Table 9, one 996-tone RU corresponds to four RU allocation subfields, and values of combination indications in all the RU allocation subfields are the same, for example, all are 11 or 00.

It may further indicate, by using the foregoing method, that one multi-RU includes a plurality of (for example, two, four, or more) large-size RUs.

It should be further understood that, when different values of the 2-bit combination indication indicate different sequences of large-size RUs during resource unit combination, if a combination indication corresponding to a small-size RU appears between the large-size RUs, the combination indication corresponding to the small-size RU does not affect combination of the large-size RUs. In other words, in a case in which the combination indication corresponding to the small-size RU appears between the large-size RUs, the combination indication corresponding to the small-size RU may be skipped or not read.

Optionally, for the combination of large-size RUs across a 242-tone RU, a 1-bit combination indication may alternatively indicate a plurality of large-size RUs included in one multi-RU. In other words, the 8-bit-index resource unit allocation subfield is extended to 9 bits, where the first 8 bits indicate a size, a location, and the like of a resource unit, the last 1 bit indicates a combination status of the resource unit. The $9^{th}$ bit is the foregoing combination indication. For example, when the combination indication is set to 0, it indicates that a large-size RU indicated by the resource unit allocation subfield is not combined, that is, is not combined with another large-size RU. When the combination indication bit is set to 1, it indicates that a large-size RU indicated by the resource unit allocation subfield is combined. Certainly, alternatively, when the combination indication is set to 1, it may indicate that a large-size RU indicated by the resource unit allocation subfield is not combined, and when the combination indication is set to 0, it indicates that a large-size RU indicated by the resource unit allocation subfield is combined. In this case, some limitations need to be imposed. For example, if one multi-RU is (a 242-tone RU+a 484-tone RU), the multi-RU should be within an 80-MHz bandwidth, a plurality of RUs included in the multi-RU are predetermined combination, and a reading sequence of the plurality of RUs is from left to right, and the like. To be specific, the combination indication may further indicate a quantity of a plurality of large-size RUs included in each multi-RU and a location relationship between the plurality of large-size RUs. In other words, the combination indication may further indicate a predefined combination manner of the plurality of large-size RUs.

It should be understood that a combination indication, of one or more bits, included in each resource unit allocation subfield may indicate the foregoing limited combination manner of the large-size RUs. To be specific, a quantity, locations, and combination of large-size RUs that need to be combined are limited to some extent. For example, a plurality of combination groups of large-size RUs that can be combined may be predefined, and the combination indication may indicate any one of the plurality of combination groups of large-size RUs.

For example, in the combination manner shown in Table 5, for different combination manners in which RUs within the 80-MHz bandwidth are combined, only a last indication bit of resource unit allocation subfields corresponding to a 242-tone RU and a 484-tone RU that need to be combined needs to be set to 1. In this way, a combination manner of large-size RUs within the 80-MHz bandwidth may be indicated, to obtain different multi-RUs.

For example, when a bandwidth is 160 MHz, as shown in Table 6, a first (a first column) 996-tone RU shown in Table 6 may be a primary 996-tone RU, namely, a primary 80-MHz bandwidth, and a second (a second column) 996-tone RU may be a secondary 996-tone RU, namely, a secondary 80-MHz bandwidth. If a 996-tone RU that needs to be combined is on the secondary 80-MHz bandwidth, after reading RU distribution on the primary 80-MHz bandwidth, the receiving device needs to read a combination indication in a resource unit allocation subfield corresponding to the secondary 996-tone RU. If the combination indication bit is set to 0, the secondary 996-tone RU is not combined. If the combination indication bit is set to 1, the secondary 996-tone RU is combined. Two different multi-RUs: a multi-RU including (a 242-tone RU+a 242-tone RU+a 996-tone RU) and a multi-RU including (a 242-tone RU+a 242-tone RU), can be identified by using this method.

In addition, for a multi-RU including (a 484-tone RU+a 242-tone RU+a 242-tone RU+a 484-tone RU), because locations of the several large-size RUs are different, only combination indications in resource unit allocation subfields corresponding to the several large-size RUs that need to be combined needs to be set to 1.

When a bandwidth is 320 MHz, a combination manner of RUs within the 320-MHz bandwidth may be a combination manner based on a 996-tone RU. For example, when reading that combination indication bits in resource unit allocation subfields corresponding to three 996-tone RUs are all set to 1, the receiving device may determine that the three 996-tone RUs need to be combined, to obtain a multi-RU including (a 996-tone RU+a 996-tone RU+a 996-tone RU).

Figure 11:
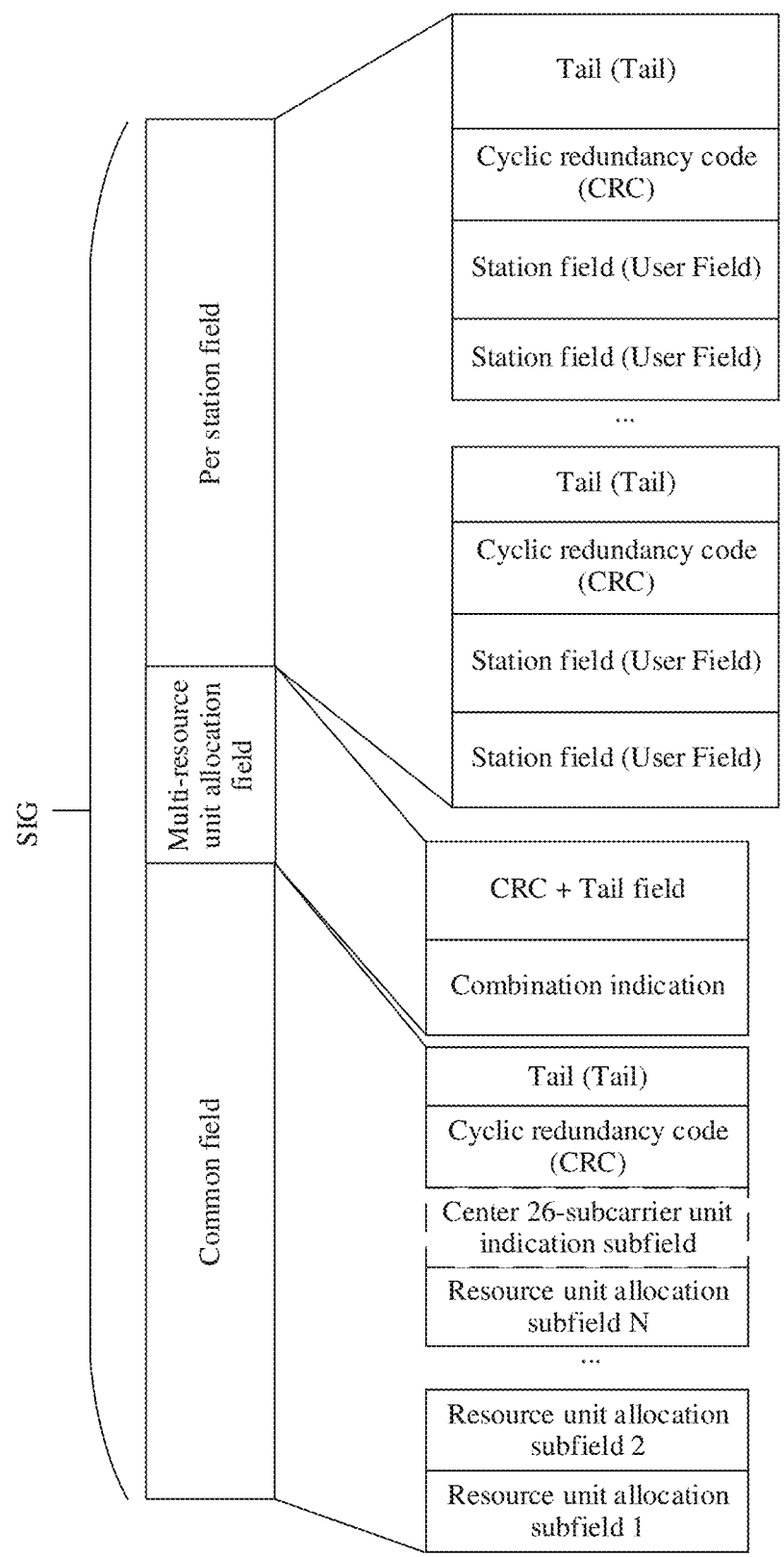
FIG. 11 is a schematic diagram of an example of a signal field according to this application.

In some other possible implementations of this application, in addition to adding a combination indication after each resource unit allocation subfield to indicate combination information, of resource units, indicated by the resource unit allocation subfield, the combination indication corresponding to each resource unit allocation subfield may be extracted together. In other words, there is a multi-resource unit allocation field (multi-RU allocation field) in the signal field, and the multi-resource unit allocation field includes the combination indication corresponding to each resource unit allocation subfield. For example, FIG. 11 is a schematic diagram of an example of a signal field according to this application. The signal field further includes a multi-resource unit allocation field, and the multi-resource unit allocation field includes a combination indication corresponding to each resource unit allocation subfield. A relative location of the combination indication in the multi-resource unit allocation field is the same as a relative location of the resource unit allocation subfield corresponding to the combination indication in a plurality of resource unit allocation subfields. The multi-resource unit allocation field indicates an RU combination status indicated by at least one resource unit allocation subfield included in the signal field. A specific indication manner is the same as the foregoing indication manner of adding an indication bit after each resource unit allocation subfield.

For example, for a 320-MHz bandwidth, a length of the combination indication included in the multi-resource unit allocation field may be 16 bits or 32 bits.

Optionally, in this embodiment of this application, the multi-resource unit allocation subfield may be included in a common field.

It should be understood that, in this embodiment of this application, the multi-resource unit allocation field newly added to the signal field may have two composition forms. FIG. 12 is a schematic diagram of a multi-resource unit allocation field according to an embodiment of this application. As shown in FIG. 12, the multi-resource unit allocation field is the same as a common field and a user specific field, and is divided into a plurality of CCs. Each CC carries some content of the multi-resource unit allocation field. FIG. 13 is a schematic diagram of another multi-resource unit allocation field according to an embodiment of this application. As shown in FIG. 13, the multi-resource unit allocation field is not divided, and completely repeated content is used on all 20-MHz channels. In other words, the multi-resource unit allocation field on each 20-MHz channel is the same.

Optionally, in some possible implementations of this application, the resource unit allocation subfield may alternatively not need to be extended in addition to that the foregoing resource unit allocation subfield is extended and that the combination information, of the resource units, is indicated by a combination indication included in an extended resource unit allocation subfield. Instead, a reserved entry indicates the combination information of the resource units. For example, as shown in Table 1, a plurality of reserved 8-bit indexes may indicate combination information, of resource units, corresponding to different resource unit allocation manners.

Optionally, in some other possible implementations of this application, the resource unit allocation subfield may be further redefined, that is, the resource unit allocation subfield is reconstructed. A reconstructed resource unit allocation subfield corresponds to allocation of frequency domain resource units of one 20-MHz channel and a combination status of the resource units. In other words, one reconstructed resource unit allocation subfield indicates a size and a location of one or more resource units included in the 20-MHz channel and the combination status of the resource units. The resource unit allocation subfield is reconstructed, so that multi-RU combination information may be directly displayed in the common field. In this way, after reading the common field, a user can directly learn of a new RU distribution sequence and a new RU combination manner. Therefore, even for a multi-RU user, only one user field needs to be used to determine the new RU distribution sequence and the new RU combination manner.

For example, a length of the reconstructed resource unit allocation subfield may be 9 bits, 10 bits, or more bits. This is not limited in this application.

It should be understood that the reconstructed resource unit allocation subfield may indicate limited RU combination, or indicate unlimited RU combination. For example, for combination of small-size RUs within the 20-MHz channel, locations, indicated by the reconstructed resource unit allocation subfield, of a 52-tone RU, a 106-tone RU, and a 26-tone RU that need to be combined are not limited. For example, a 26-tone RU that needs to be combined with a 52-tone RU or a 106-tone RU may be contiguous or discontiguous to the 52-tone RU or the 106-tone RU. For combination of large-size RUs across a 242-tone RU, a reconstructed resource unit allocation subfield of a corresponding configuration is used on a corresponding 20-MHz channel. For example, if there is combination of a 242-tone RU+a 242-tone RU within an 80-MHz channel, only resource unit allocation subfields indicating the combination of a 242-tone RU+a 242-tone RU need to be used at both of corresponding 20-MHz channels.

Optionally, in some possible implementations of this application, a receiving device may be further notified of multi-RU combination information by extracting and indicating a valid RU. In other words, all valid RUs are extracted and sorted based on a sequence in which the user reads the valid RUs. One valid RU corresponds to 1 bit. A valid RU set is {52, 106, 242, 484, 996}, and a number in the set indicates a quantity of subcarriers forming the RU. The valid RUs are associated based on locations of the valid RUs in a bandwidth. For example, if there are 20 valid RUs in a 320-MHz channel, at least 20 bits are needed to indicate combined information of the RUs.

For example, for combination of small-size RUs within a 242-tone RU, each valid small-size RU may correspond to 1 bit, to indicate whether a corresponding valid small-size RU and a 26-tone RU are combined to obtain one multi-RU. A valid small-size RU set is {52, 106}. Specifically, the multi-resource unit allocation field in the signal field may include a plurality of combination indications. Each combination indication corresponds to one valid small-size RU, and indicates whether the valid small-size RU and a 26-tone RU within the 242-tone RU in which the valid small-size RU is located are combined. For example, when a combination indication bit corresponding to one valid small-size RU is set to 1, it indicates that the valid small-size RU and a 26-tone RU within the 242-tone RU in which the valid small-size RU is located are combined, and when an indication bit corresponding to the one valid small-size RU is set to 0, it indicates that the valid small-size RU is not combined. Alternatively, when a combination indication bit corresponding to one valid small-size RU is set to 0, it indicates that the valid small-size RU and a 26-tone RU within the 242-tone RU in which the valid small-size RU is located are combined, and when the combination indication bit corresponding to the one valid small-size RU is set to 1, it indicates that the valid small-size RU is not combined.

It should be understood that when the combination indication indicates that the valid small-size RU and the 26-tone RU within the 242-tone RU in which the valid small-size RU is located are combined, the 26-tone RU combined with the valid small-size RU may be a 26-tone RU contiguous to the valid small-size RU. For example, the valid small-size RU and a first 26-tone RU on the left or right of the valid small-size RU are combined to obtain one multi-RU. In other words, a combination indication corresponding to one valid small-size RU indicates a limited combination manner of small-size RUs.

It may be understood that, for the combination of small-size RUs within a 242-tone RU, one 242-tone may include a maximum of three valid small-size RUs. Therefore, one 242-tone (or one resource unit allocation subfield) may correspond to a 1-bit combination indication, and the 1-bit combination indication may correspond to one 52-tone RU or one 106-tone RU. Alternatively, one 242-tone may correspond to a 2-bit combination indication. Each bit in the 2-bit combination indication indicates one 52-tone RU; or 1 bit in the 2-bit combination indication indicates one 52-tone RU, and the other bit indicates a 106-tone RU. Alternatively, one 242-tone may correspond to a 3-bit combination indication, and each bit in the 3-bit combination indication indicates one 52-tone RU.

It should be understood that, for the combination of small-size RUs within a 242-tone RU, because there may be a plurality of valid small-size RUs in RUs indicated by one RU allocation subfield, lengths of combination indications corresponding to different RU allocation subfields may be different. Therefore, a length of the multi-resource unit allocation field is variable. Optionally, the length of the combination indication corresponding to the RU allocation subfield may be indicated in the common field. Alternatively, lengths of combination indications corresponding to different RU allocation subfields may be set to be the same. For example, it is assumed that a maximum of x valid RUs in each RU allocation subfield are combined, for N RU allocation subfields, the length of the multi-resource unit allocation field is N*xbits.

For the combination of large-size RUs across a 242-tone RU, namely, a combination indication of valid large-size RUs, a valid large-size RU set is {242, 484, 996}.

Optionally, in a possible implementation, in the combination indications included in the multi-resource unit allocation field, one valid large-size RU may correspond to a 2-bit combination indication. Different values of the 2-bit combination indication indicate different sequences of the valid large-size RU during resource unit combination. For example, when a combination indication bit is set to 00, it indicates that the valid large-size RU is not combined. When the combination indication bit is set to 01, 10, and 11, it respectively indicates that the valid large-size RU is located at the beginning, in the middle, and at the end of a combination location.

Optionally, in a possible implementation, in the combination indications included in the multi-resource unit allocation field, one valid large-size RU corresponds to a 2-bit indication bit. Different values of the 2-bit indication bit indicate different combination states of the valid large-size RU during resource unit combination. For example, when a combination indication bit is set to 00, it indicates that the valid large-size RU is not combined. When the combination indication bit is set to 01, 10, and 11, it separately indicates different combination types of the valid large-size RU, and valid large-size RUs corresponding to combination indications with a same value are combined.

In some possible implementations of this application, for the combination of large-size RUs across a 242-tone RU, namely, the combination indication of the valid large-size RUs, one valid large-size RU may alternatively correspond to a 1-bit indication bit, and indicate whether the valid large-size RU is combined. For example, when the combination indication bit is set to 0, it indicates that the valid large-size RU is not combined, and when the combination indication bit is set to 1, it indicates that the valid large-size RU is combined. Certainly, when the combination indication bit is set to 1, it may alternatively indicate that the valid large-size RU is not combined, and when the combination indication bit is set to 0, it indicates that the valid large-size RU is combined. In this case, combination, locations, and the like of a plurality of large-size RUs included in one multi-RU need to be predefined.

For example, Table 10 is a schematic diagram of an example of a correspondence between a combination indication and a valid large-size RU.

TABLE 10

| Valid large-size RUs indicated by different resource unit allocation subfields | 242-tone RU | 242-tone RU | 242-tone RU | 242-tone RU | 996-tone RU | 484-tone RU | 242-tone RU | 242-tone RU | 996-tone RU |
|---|---|---|---|---|---|---|---|---|---|
| Values of combination indications corresponding to different valid large-size RUs | 1 | 0 | 0 | 1 | 1 | 1 | 1 | 0 | 0 |

In the example shown in Table 10, when the combination indication bit is set to 0, it indicates that the valid large-size RU corresponding to the combination indication is not combined, and when the combination indication bit is set to 1, it indicates that the valid large-size RU corresponding to the combination indication is combined. In this case, confusion may be caused if no limitation is imposed. In the example shown in Table 10, it is difficult to distinguish whether a 996-tone RU+a 484-tone RU+a 242-tone RU are combined into one multi-RU, or a 242-tone RU+a 242-tone RU+a 996-tone RU are combined into one multi-RU. Therefore, a combination group, a combination manner, or the like of large-size RUs may be predefined or configured. For example, this can be solved by selecting predetermined combination appearing from left to right. It is assumed that preset large-RU combination is a 242-tone RU+a 242-tone RU+a 996-tone RU, that is, it may be determined that the multi-RU shown in Table 10 includes the 242-tone RU+the 242-tone RU+the 996-tone RU. It should be understood that, in Table 10, one 996-tone RU corresponds to four RU allocation subfields, and values of combination indications corresponding to all the RU allocation subfields are the same, for example, all are 1 or 0. One 484-tone RU corresponds to two RU allocation subfields, and values of combination indications in all the RU allocation subfields are the same, for example, both are 1.

In other words, a combination indication, of one or more bits, corresponding to each valid large-size RU may indicate the foregoing limited combination manner of the large-size RUs. To be specific, a quantity, locations, and combination of large-size RUs that need to be combined are limited to some extent. For example, a plurality of combination groups of large-size RUs that can be combined may be predefined, and a combination indication may indicate any one of the plurality of combination groups of large-size RUs.

According to a resource unit combination indication method provided in this application, valid RUs are extracted, and combination indications indicating whether the valid RUs are combined are arranged based on locations of the valid RUs, so that multi-RU combination information can be effectively indicated.

It should be understood that, in addition to that the combination indications corresponding to the valid RUs are uniformly set in the multi-resource unit allocation field in the signal field, optionally, the resource unit allocation subfield may be further extended, a combination indication of a valid RU corresponding to each resource unit allocation subfield is set after a corresponding resource unit allocation subfield. For example, an extended resource unit allocation subfield may be 9 bits, 10 bits, or more bits, and one or more extended bits separately indicate combination statuses of the valid RUs.

Optionally, in some possible implementations of this application, in addition to that the common field in the signal field is improved to implement multi-RU combination, the user field may be further improved to notify the multi-RU combination.

In a possible implementation, STA IDs in different user fields may be set to be the same. In this way, a user may know that a plurality of corresponding RUs are allocated to the user, so that RU combination information is notified.

In another possible implementation, one multi-RU is formed by combining a plurality of contiguous or discontiguous RUs. A plurality of contiguous or discontiguous RUs forming the multi-RU may be allocated to one user, and STA IDs respectively corresponding to the plurality of RUs are the same. Therefore, information in user fields with a same STA ID other than a last user field in the user fields may be modified. For example, in each of the user fields with the same STA ID other than the last user field, 9-bit indication information may indicate absolute location information or relative location information of a next RU belonging to the user (or corresponding to the user). A multi-resource unit user can directly learn, based on the indication, of a location of a next RU after reading a first RU. This reduces energy consumption to some extent.

In still another possible implementation, one multi-RU is formed by combining a plurality of contiguous or discontiguous RUs. The plurality of contiguous or discontiguous RUs forming the multi-RU may be allocated to one user, and STA IDs respectively corresponding to the plurality of RUs are the same. Therefore, in this embodiment of this application, in each of a plurality of user fields with a same STA ID other than a last user field, 8-bit indication information may indicate absolute location information or relative location information of a next RU belonging to the user. In other words, locations, sizes, and the like of the plurality of RUs forming the multi-RU are indicated.

For example, in each of the plurality of user fields with the same STA ID other than the last user field, a location of a next RU that needs to be combined and that is of an RU corresponding to the user field may be flexibly identified by indicating two pieces of information: an index channel number and an RU appearance order.

Specifically, after a STA determines a resource unit allocation subfield, the STA may determine, by using a 4-bit indication, a channel on which an RU that needs to be combined with an RU in which the STA is currently located is located (the 4-bit indication may indicate 16 channels). The STA may use other 4 bits to indicate a specific RU (each 242-tone includes a maximum of nine RUs) location on each channel. Therefore, 8 bits may flexibly indicate a location of a next RU that needs to be combined. In other words, in the plurality of user fields with the same STA ID other than the last user field, an 8-bit indication field may indicate location information of a next RU that needs to be combined with a current user field. In this way, the information about the RU that needs to be combined with an RU where a current user is located is determined.

For example, when one multi-RU is formed by combining two RUs, STA IDs of two user fields corresponding to the two RUs are the same. Therefore, in a first user field, an 8-bit indication field may indicate location information of a next RU that needs to be combined with a current user field, so that the multi-RU can be determined.

For another example, when one multi-RU is formed by combining three RUs, STA IDs of three user fields corresponding to the three RUs are the same. There may be an 8-bit indication field in both of a first user field and a second user field. The 8-bit indication field separately indicates locations of a second RU and a third RU that need to be combined, so that the multi-RU can be determined. Similarly, when one multi-RU is formed by combining more RUs, the multi-RU can be determined only by setting an 8-bit indication field in a user field corresponding to an RU other than a last RU.

It should be understood that the 8-bit indication field in the user field may indicate an unlimited combination manner or a limited combination manner. In addition, the combination of small-size RUs within the 20-MHz channel may be indicated, or the combination of large-size RUs across a 242-tone RU may be indicated.

In some other possible implementations, in each of a plurality of user fields with a same STA ID other than a last user field, 4 bits may further indicate location information of an RU in a limited RU combination manner. It is assumed that a small-size RU in a 242-tone RU does not support the combination across a 242-tone RU. For the combination of small-size RUs within the 20-MHz channel, because there are a maximum of nine RUs in each 242-tone RU, 4 bits can completely indicate a location of a next combined RU. Certainly, for the combination of small-size RUs within the 20-MHz channel, 3 bits may also completely indicate a location of a next combined RU. Therefore, for the combination of small-size RUs within the 20-MHz channel, in a plurality of user fields with a same STA ID other than a last user field, 3 bits or 4 bits may indicate information about an RU that needs to be combined with an RU that a current user is located in (or corresponding to).

For the combination of large-size RUs across a 242-tone RU, because a small-size RU cannot be combined with a large-size RU across a 242-tone RU, a specific quantity of indication bits may indicate a type of the large-size RU, and a specific quantity of indication bits indicate a location of the large-size RU. The large-size RU that needs to be combined is indicated by indicating two pieces of information: the type of the large-size RU and the location of the large-size RU. The type of the large-size RU refers to a 242-tone RU, a 484-tone RU, or a 996-tone RU. For example, in each of the plurality of user fields with the same STA ID other than the last user field, 2 bits may indicate a type of an RU that needs to be combined with a large-size RU in which a current user is located. For example, types of large-size RUs respectively indicated by setting the 2 bits to 00, 01, and 10 are a 242-tone RU, a 484-tone RU, and a 996-tone RU, and the other 2 bits indicate subsequent large-size RUs of the type.

In other words, in each of the plurality of user fields with the same STA ID other than the last user field, 3 bits or 4 bits may indicate information about the large-size RU that needs to be combined with the RU in which the current user is located. For example, when one multi-RU is formed by combining three large-size RUs, there may be a 4-bit indication field in a first user field and a second user field in three user fields corresponding to the three large-size RUs. The 4-bit indication field indicates locations of the second large-size RU and the third large-size RU that need to be combined, so that the multi-RU can be determined. Similarly, when one multi-RU is formed by combining more RUs, the multi-RU can be determined only by setting the 4-bit indication field in all user fields corresponding to RUs other than a last RU.

For example, for the multi-RU (a 242-tone RU+a 242-tone RU) formed in the combination manner 1 shown in Table 5, there may be a 4-bit indication bit in a user field corresponding to the first 242-tone RU, and 4 bits are set to 0010. The first 2 bits are set to 00 to indicate that a next to-be-combined RU is a 242-tone RU, and the last 2 bits are set to 10 to indicate that the RU is a third RU after a current RU. The user may learn of a location of a specific RU with reference to known resource unit allocation subfield information, to determine the multi-RU. A user field corresponding to the second 242-tone RU may not need to be modified. Therefore, the 4-bit indication bit may indicate a limited multi-RU combination manner.

It should be further understood that, if indication flexibility needs to be further improved, a quantity of used bits may be further increased. For example, in each of the plurality of user fields with the same STA ID other than the last user field, an indication bit of another length indicates information about the large-size RU that needs to be combined with the RU in which the current user is located.

Optionally, in this embodiment of this application, regardless of the combination of large-size RUs or the combination of small-size RUs, for a plurality of user fields corresponding to a plurality of RUs that need to be combined, because STA IDs of the plurality of user fields are the same, an indication bit indicating whether each of the plurality of user fields (including a last user field) is the last user field may be further added to the user field, and the indication bit indicates whether the user field is a user field corresponding to a last RU that needs to be combined. In this way, the user may be prevented from considering that the last user field further includes information indicating a location of a next RU. For example, a 1-bit indication is used. The 1 bit in a user field other than the last user field is set to 1, to indicate that the corresponding user field is not the last user field, and the 1 bit in a user field other than the last user field is set to 0, to indicate that the corresponding user field is the last user field.

It should be noted that, because there is a correspondence between a location of an RU and a location of a user field in a user specific field, an indication of the location of the RU is an indication of the location of the user field corresponding to the RU.

Optionally, in this embodiment of this application, for a plurality of user fields corresponding to a plurality of RUs that need to be combined, because STA IDs of the plurality of user fields are the same, an indication bit indicating a quantity of RUs that need to be combined may be further added to each of the plurality of user fields (including a last user field), to indicate the quantity of RUs that need to be combined. For example, when four RUs need to be combined, a length of the indication bit may be 2 bits. A value of the indication bit in each user field is the same, so that the user can more accurately read the quantity of RUs that need to be combined.

In other possible implementations of this application, the signal field may further include a multi-resource unit allocation field (multi-RU allocation field), and the multi-resource unit allocation field includes a plurality of location information indication subfields. One location information indication subfield indicates a location of one RU that needs to be combined into a multi-RU. Two or more of the plurality of location information indication subfields form one group, and a plurality of RUs indicated by one group of location information indication subfields are combined into one multi-RU. On the basis of reading the resource unit allocation subfield, with reference to a plurality of location information indication bits, a user may know an RU allocated to the user based on an order in which the user appears in the user specific field, to further obtain multi-RU combination information on the basis of obtaining an RU allocation form. In this manner, users are still sorted based on an RU appearing sequence, and each user appears for only one time in the user specific field. Information such as an allocated RU may be obtained by searching for a location of the user.

Figure 14:
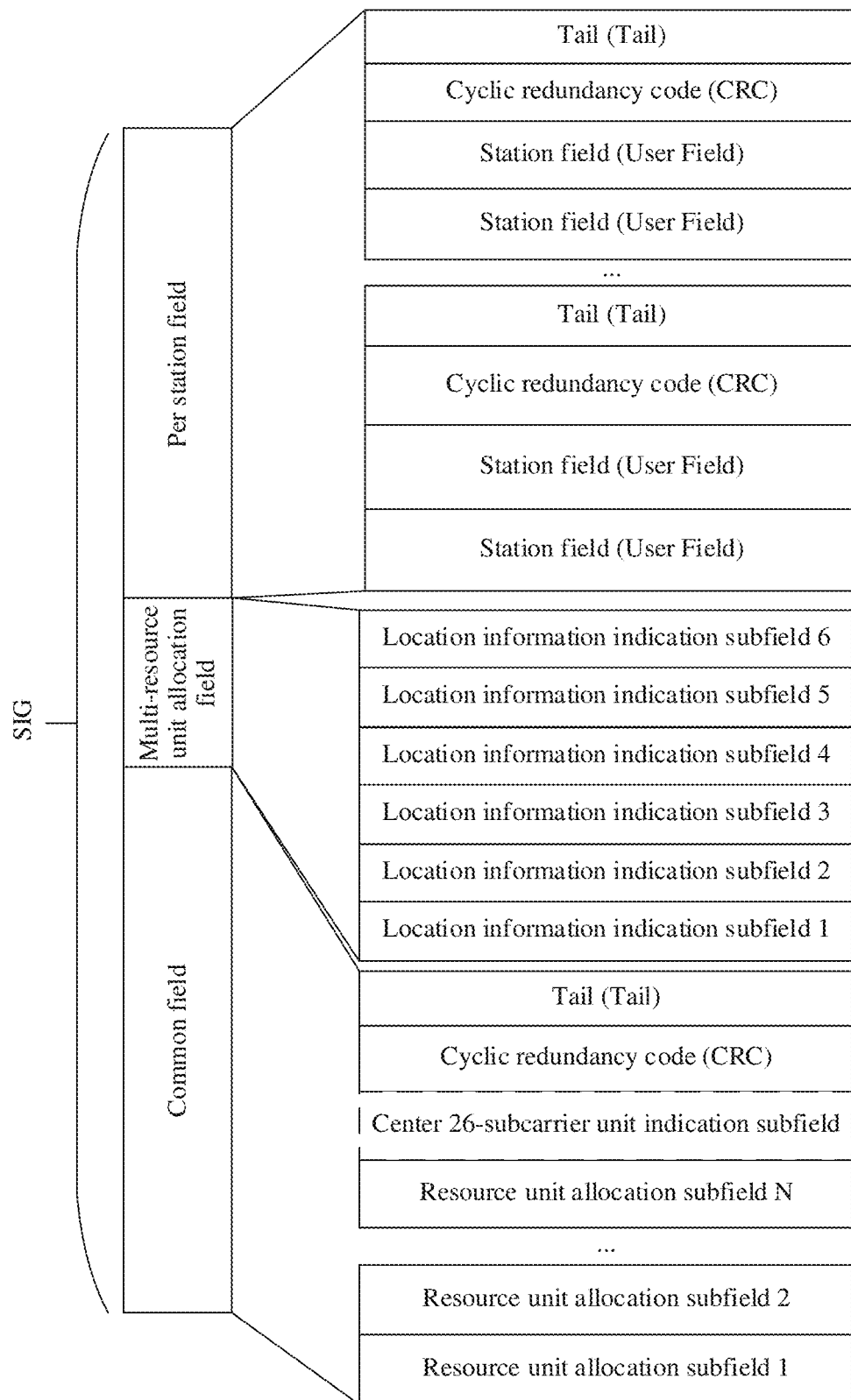
FIG. 14 is a schematic diagram of an example of a signal field according to this application.

Specifically, in a possible implementation, the following provides description with reference to an example shown in FIG. 14. FIG. 14 is a schematic diagram of an example of a signal field according to this application. The signal field further includes a multi-resource unit allocation field, the multi-resource unit allocation field includes a plurality of location information indication subfields, and one location information indication subfield indicates a location of one RU that needs to be combined into a multi-RU. RUs indicated by neighboring location information indication field need to be combined. For example, in the example shown in FIG. 14, the multi-resource unit allocation field includes six location information indication subfields, and one location information indication subfield indicates a location of one RU that needs to be combined into a multi-RU.

Figure 15:
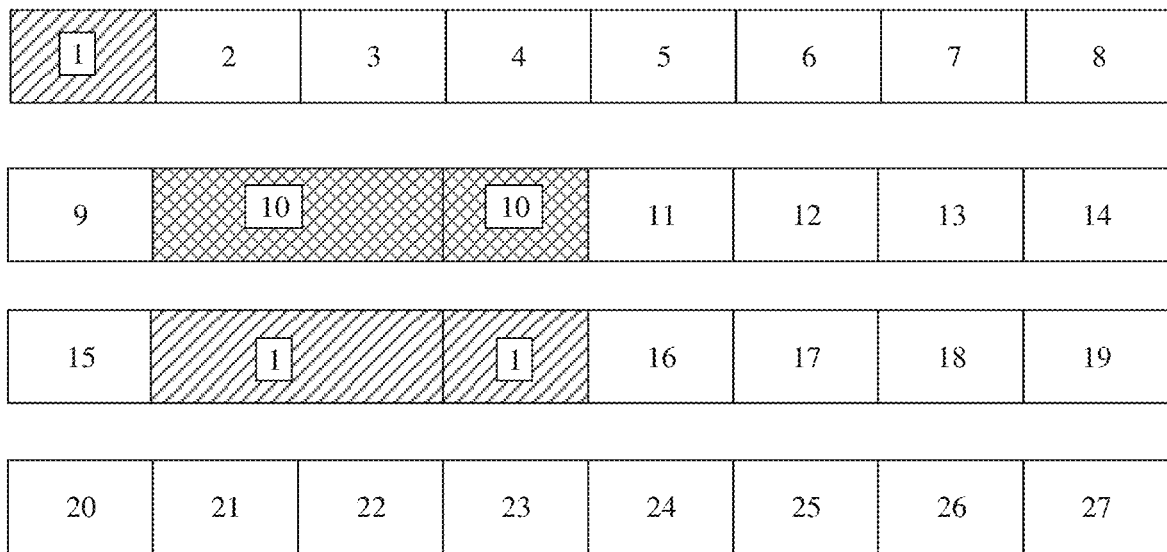
FIG. 15 is a schematic diagram of an example of determining a resource unit based on location information of the resource unit according to an embodiment of this application.

It is assumed that three RUs indicated by a location information indication subfield 1 to a location information indication subfield 4 need to be combined into one multi-RU, and two RUs indicated by a location information indication subfield 5 and a location information indication subfield 6 need to be combined into another multi-RU. As shown in FIG. 15, each rectangle shown in FIG. 15 indicates one RU, a number in the rectangle indicates a specific user corresponding to the RU (or an appearance sequence of a user field), and each row of rectangles corresponds to one 20-MHz bandwidth. It is assumed that the location information indication subfield 1 indicates a location 1, indicating a first rectangle in a first row, and the location information indication subfield 2 indicates a location 2, indicating a second rectangle in a third row. In addition, RUs at the location 1 and the location 2 may be combined. The location information indication subfield 3 also indicates the location 2. To be specific, both of the location information indication subfield 3 and the location information indication subfield 2 indicate the RU at the location 2. The location information indication subfield 4 indicates a location 3, indicating a third rectangle in the third row. In addition, the location 3 corresponds to only one location information indication subfield 4. It may be determined that an RU at the location 3 is a last RU included in the one multi-RU, and only the RU indicated by the location information indication subfield 4 and the RU indicated by a previous location information indication subfield (the location information indication subfield 3) need to be combined. Therefore, it may be determined that the multi-RU includes: the RU indicated by the location information indication subfield 1+the RU indicated by the location information indication subfield 2 or 3+the RU indicated by the location information indication subfield 4. To be specific, when one multi-RU includes three RUs, an RU in the middle corresponds to two location information indication subfields. In other words, four location information indication subfields are needed to indicate combination of the three RUs.

Further, the location information indication subfield 5 indicates a location 4, indicating a second rectangle in a second row, and the location information indication subfield 6 indicates a location 5, indicating a third rectangle in the second row. If no other location information indication subfield 6 subsequently also indicates the location 5, it may be determined that the another multi-RU includes an RU indicated by the location information indication subfield 5 and an RU indicated by the location information indication subfield 6. A user may determine an RU allocated to the user based on an order in which the user appears in the user specific field, to further obtain multi-RU combination information on the basis of obtaining an RU allocation form. For example, in the example shown in FIG. 13, the three RUs corresponding to the location 1 to the location 4 are combined into the one multi-RU used by a user 1. The two RUs corresponding to the location 5 to the location 6 are combined into the another multi-RU used by a user 10.

Optionally, a length of each location information indication subfield may be 4 bits, 8 bits, 9 bits, or another length, to indicate the combination of small-size RUs within a 242-tone RU and the combination of large-size RUs across a 242-tone RU. Optionally, both of the combination of small-size RUs within a 242-tone RU and the combination of large-size RUs across a 242-tone RU may be unlimited RU combination.

Optionally, in another possible implementation, a 1-bit group indication bit may be added to each location information indication subfield, and RUs indicated by a plurality of location information indication subfields whose values of group indication bits are the same may be combined into one multi-RU. For example, as shown in FIG. 13, if the one multi-RU includes the three RUs, a 1-bit group indication bit may be separately added to three location information indication subfields corresponding to the three RUs, and values of group indication bits corresponding to the three RUs are the same. In this way, it may be indicated that the three RUs need to be combined into the one multi-RU. RUs that need to be combined into one multi-RU are not determined by repeatedly indicating a location of one RU, so that a quantity of required location information indication subfields can be reduced. In other words, three location information indication subfields may indicate combination of the three RUs. RUs at a same location do not correspond to two location information indication subfields. A user may determine an RU allocated to the user based on an order in which the user appears in the user specific field, to further obtain multi-RU combination information on the basis of obtaining an RU allocation form. In addition, the same user needs to appear for only one time in the user specific field.

It should be understood that, in this embodiment of this application, a length of the multi-resource unit allocation field may be indicated in the common field. In addition, the plurality of location information indication subfields included in the multi-resource unit allocation field may exist on both of the CC 1 and the CC 2. Alternatively, one part of the plurality of location information indication subfields exist on the CC 1, and the other part of the plurality of location information indication subfields exist on the CC 2. This is not limited in this embodiment of this application.

Optionally, in some other possible implementations of this application, for a combination status of a center 26-tone RU in the middle of each 80-MHz channel, the center 26-tone RU may also be combined with another RU to obtain one multi-RU. Whether the center 26-tone RU exists depends on a value of a center 26-tone RU field in the common field, and the field has 1 bit. When the 1 bit is set to 1, it indicates that the center 26-tone RU exists. When the 1 bit is set to 0, it indicates that the center 26-tone RU does not exist.

In a possible implementation, the center 26-tone RU field may be extended to a plurality of bits, for example, to 2 bits. When the 2 bits are set to 00, it indicates that the center 26-tone RU does not exist on a corresponding 80-MHz frequency band. When the 2 bits are set to 01, it indicates that the center 26-tone RU exists on the corresponding 80-MHz frequency band, but the center 26-tone RU is not combined, that is, not combined with another RU. When the 2 bits are set to 10 and 11, it separately indicates that the center 26-tone RU exists on the corresponding 80-MHz frequency band, and the center 26-tone RU needs to be combined with another RU.

For example, when the 2 bits are set to 10, it indicates that the center 26-tone RU and a contiguous RU within a 242-tone range on the right of the center 26-tone RU are combined to obtain one multi-RU. When the 2 bits are set to 11, it indicates that the center 26-tone RU and a contiguous RU within the 242-tone range on the left of the center 26-tone RU are combined to obtain one multi-RU.

For another example, when the 2 bits are set to 10, it indicates that the center 26-tone RU and an RU that is within a 242-tone range on the right of the center 26-tone RU and that is closest to the center 26-tone RU are combined to obtain one multi-RU. When the 2 bits are set to 11, it indicates that the center 26-tone RU and an RU that is within the 242-tone range on the left of the center 26-tone RU and that is closest to the center 26-tone RU are combined to obtain one multi-RU.

The RU contiguous to the center 26-tone RU may be understood as an RU before or after the center 26-tone RU. The RU closest to the center 26-tone RU may be or may not be an RU contiguous to the center 26-tone RU. For example, the RU closest to the center 26-tone RU may be an RU that is at coordinates of the center 26-tone RU or on the right of the coordinates of the center 26-tone RU and that is spaced by a plurality of RUs.

It should be understood that, in this embodiment of this application, the center 26-tone RU field may be further extended to a plurality of bits, to indicate more combination statues of the center 26-tone RU.

It should be further understood that an RU, within the 242-tone range, that is closest to or contiguous to the center 26-tone RU may be a 52-tone RU, a 106-tone RU, a 242-tone RU, or the like.

In another possible implementation, a combination indication indicating whether the center 26-tone RU and a plurality of RUs are combined may be further set in a user field corresponding to the center 26-tone RU. In other words, the user field corresponding to the center 26-tone RU is modified. In addition, all users need to read the user field corresponding to the center 26-tone RU, and determine whether a STA ID in the user field corresponding to the center 26-tone RU is the same as IDs of the users. If the STA ID in the user field corresponding to the center 26-tone RU is the same as the IDs of the users, the center 26-tone RU and an RU corresponding to the current user field need to be combined.

It should be understood that in embodiments of this application, "first", "second", and the like are merely intended to indicate that a plurality of objects are different. For example, a first field and a second field are merely used to indicate different fields. The field itself, a quantity of fields, and the like should not be affected. The foregoing first, second, and the like should not constitute any limitation on embodiments of this application.

It should be further understood that division of the manners, cases, categories, and embodiments in embodiments of this application is merely intended for ease of description, and should not constitute a particular limitation. The features in the manners, categories, cases, and embodiments may be combined without contradiction.

It should be further understood that numerals used in embodiments of this application are differentiated merely for ease of description, but are not used to limit the scope of embodiments of this application. The sequence numbers of the foregoing processes do not mean execution sequences. The execution sequences of the processes should be determined according to functions and internal logic of the processes, and should not be construed as any limitation on the implementation processes of embodiments of this application.

It should be further understood that, the foregoing description is merely intended to help a person skilled in the art better understand embodiments of this application, instead of limiting the scope of embodiments of this application. It is clear that a person skilled in the art may make various equivalent modifications or changes based on the foregoing examples. For example, in the foregoing method 200, some steps may be unnecessary or some steps may be newly added. Alternatively, any two or more of the foregoing embodiments are combined. A modified, changed, or combined solution also falls within the scope of embodiments of this application.

It should be further understood that the foregoing description of embodiments of this application emphasizes differences between embodiments. For same or similar parts that are not mentioned, refer to embodiments. For brevity, details are not described herein again.

It should be further understood that in embodiments of this application, "predefinition" may be implemented by pre-storing corresponding code or a corresponding table in a device (for example, a terminal device or a network device) or in another manner that can indicate related information. A specific implementation of "predefinition" is not limited in this application.

The foregoing describes in detail the resource unit combination indication method in embodiments of this application with reference to FIG. 1 to FIG. 15. The following describes in detail communications apparatuses in embodiments of this application with reference to FIG. 16 to FIG. 22.

Figure 16:
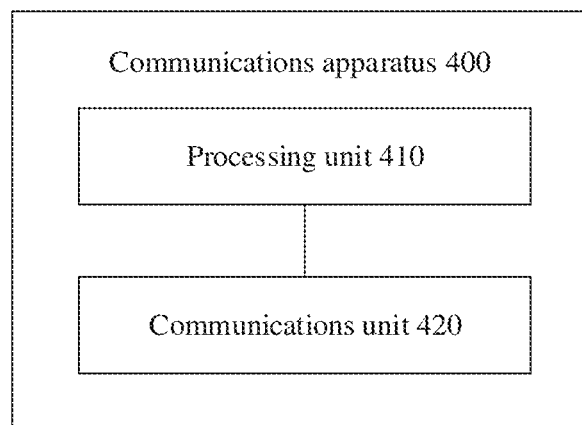
FIG. 16 is a schematic diagram of a communications apparatus according to an embodiment of this application.

FIG. 16 is a schematic block diagram of a communications apparatus 400 according to an embodiment of this application. The apparatus 400 may correspond to the sending device described in the foregoing methods, or may be a chip or a component used in the sending device. In addition, modules or units in the apparatus 400 are respectively configured to perform actions or processing processes performed by the sending device in the foregoing methods. As shown in FIG. 16, the communications apparatus 400 may include a processing unit 410 and a communications unit 420.

The processing unit 410 is configured to determine a physical layer protocol data unit PPDU. The PPDU includes a signal field, the signal field includes a resource unit allocation subfield and a combination indication corresponding to the resource unit allocation subfield, the resource unit allocation subfield indicates a plurality of resource units, and the combination indication indicates combination information of the plurality of resource units.

The communications unit 420 is configured to send the PPDU.

Alternatively, the processing unit 410 is configured to determine a physical layer protocol data unit PPDU. The PPDU includes a signal field, the signal field includes a plurality of resource unit allocation subfields and a plurality of combination indications, the plurality of resource unit allocation subfields indicate a plurality of resource units, the plurality of combination indications indicate combination information of the plurality of resource units, one combination indication corresponds to an RU indicated by one resource unit allocation subfield, and one resource unit is a 242-tone RU, a 484-tone RU, or a 996-tone RU.

The communications unit 420 is configured to send the PPDU.

The communications apparatus provided in this application can be used to support one or more users in transmitting data by using a plurality of contiguous or discontiguous RUs, and indicate a combination status of the plurality of RUs to the user. This improves RU allocation flexibility of a system, and improves spectrum utilization of the system.

It should be understood that for a specific process of performing the foregoing corresponding steps by the units in the apparatus 400, refer to the foregoing description with reference to the method embodiments in FIG. 9 to FIG. 15. For brevity, details are not described herein again.

Optionally, the communications unit 420 may include a receiving unit (module) and a sending unit (module) that are configured to perform the step of sending information by the sending device in the foregoing methods. Optionally, the communications apparatus 400 may further include a storage unit 430. The storage unit 430 is configured to store instructions executed by the communications unit 420 and the processing unit 410. The communications unit 420, the processing unit 410, and the storage unit 430 are coupled to each other. The storage unit 430 stores instructions. The processing unit 410 is configured to execute the instructions stored in the storage unit 430. The communications unit 420 is configured to send or receive a specific signal under driving of the processing unit 410.

Figure 17:
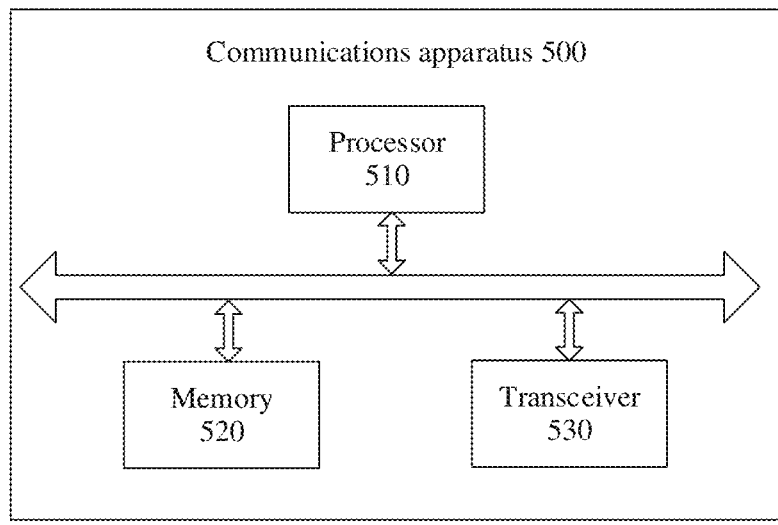
FIG. 17 is a schematic diagram of another communications apparatus according to an embodiment of this application.

The processing unit 410 may be a processor. The communications unit 420 may be a transceiver, an input/output interface, or an interface circuit. The storage unit 430 may be a memory. As shown in FIG. 17, a communications apparatus 500 may include a processor 510, a memory 520, and a transceiver 530. When the communications apparatus is a chip in a communications device, the storage unit may be a storage unit (for example, a register or a cache) in the chip, or may be a storage unit (for example, a read-only memory or a random access memory) outside the chip in the communications device.

It may be clearly understood by a person skilled in the art that, for steps performed by the communications apparatuses 400 and 500 and corresponding beneficial effects, refer to related description of the sending device in the foregoing method embodiment. For brevity, details are not described herein again.

The communications apparatus 400 or 500 may be a sending device. For example, the sending device may be an AP, a STA, or a network device.

Figure 18:
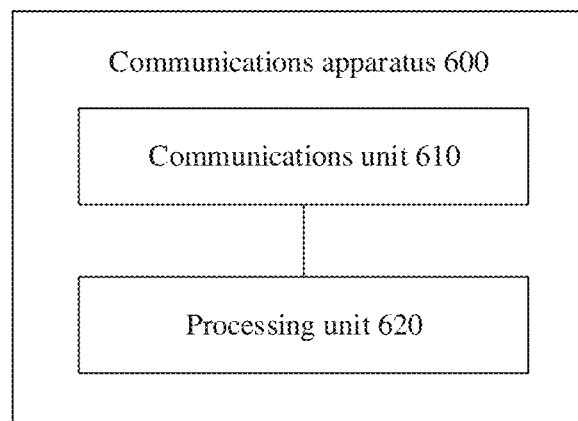
FIG. 18 is a schematic diagram of a communications apparatus according to an embodiment of this application.

FIG. 18 is a schematic block diagram of a communications apparatus 600 according to an embodiment of this application. The apparatus 600 may correspond to the receiving device described in the foregoing embodiments, or may be a chip or a component used in the receiving device. In addition, modules or units in the apparatus 600 are respectively configured to perform actions or processing processes performed by the receiving device in the foregoing method embodiment. As shown in FIG. 18, the communications apparatus 600 may include a communications unit 610 and a processing unit 620.

The communications unit 610 is configured to receive a physical layer protocol data unit PPDU. The PPDU includes a signal field, the signal field includes a resource unit allocation subfield and a combination indication corresponding to the resource unit allocation subfield, the resource unit allocation subfield indicates a plurality of resource units, and the combination indication indicates combination information of the plurality of resource units.

The processing unit 620 is configured to determine the combination information of the plurality of resource units based on the PPDU.

Alternatively, the communications unit 610 is configured to receive a physical layer protocol data unit PPDU. The PPDU includes a signal field, the signal field includes a plurality of resource unit allocation subfields and a plurality of combination indications, the plurality of resource unit allocation subfields indicate a plurality of resource units, the plurality of combination indications indicate combination information of the plurality of resource units, one combination indication corresponds to an RU indicated by one resource unit allocation subfield, and one resource unit is a 242-tone RU, a 484-tone RU, or a 996-tone RU.

The processing unit 620 is configured to determine the combination information of the plurality of resource units based on the PPDU.

According to the communications apparatus provided in this application, the combination indication in the signal field may indicate a combination status of small-size RUs within a 20-MHz channel, to support one or more users in transmitting data by using a plurality of contiguous or discontiguous RUs. This improves RU allocation flexibility of a system, and improves spectrum utilization of the system.

It should be understood that for a specific process of performing the foregoing corresponding steps by the units in the apparatus 600, refer to the foregoing description of the receiving device in the foregoing embodiment. For brevity, details are not described herein again.

Optionally, the communications unit 610 may include a receiving unit (module) and a sending unit (module) that are configured to perform the step of receiving information by the receiving device in the method embodiment. Optionally, the communications apparatus 600 may further include a storage unit 630. The storage unit 630 is configured to store instructions executed by the communications unit 610 and the processing unit 620. The communications unit 610, the processing unit 620, and the storage unit 630 are coupled to each other. The storage unit 630 stores instructions. The processing unit 620 is configured to execute the instructions stored in the storage unit 630. The communications unit 610 is configured to send or receive a specific signal under driving of the processing unit 620.

Figure 19:
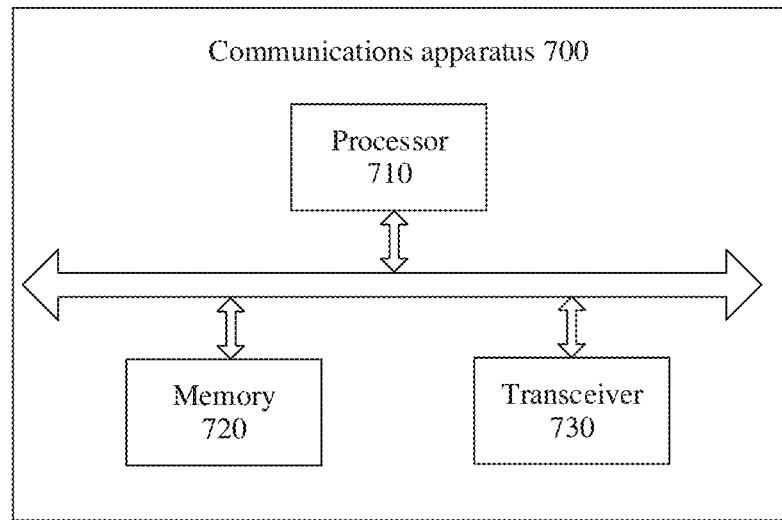
FIG. 19 is a schematic diagram of another communications apparatus according to an embodiment of this application.

It should be understood that the processing unit 620 may be implemented by a processor, and the communications unit 610 may be implemented by a transceiver. The storage unit 630 may be implemented by using a memory. As shown in FIG. 19, a communications apparatus 700 may include a processor 710, a memory 720, and a transceiver 730.

It may be clearly understood by a person skilled in the art that, for steps performed by the communications apparatuses 600 and 700 and corresponding beneficial effects, refer to related description of the receiving device in the foregoing embodiment. For brevity, details are not described herein again.

The communications apparatus 600 or 700 may be a receiving device, for example, a terminal device.

It should be further understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and are invoked by a processing element of the apparatus to perform functions of the units. The processing element herein may also be referred to as a processor, and may be an integrated circuit having a signal processing capability. During implementation, steps in the foregoing methods or the foregoing units may be implemented by using a hardware integrated logic circuit in the processor element, or may be implemented in the form in which a processing element invokes software.

For example, a unit in any one of the foregoing apparatuses may be one or more integrated circuits configured to implement the foregoing methods, for example, one or more application specific integrated circuits (ASIC), one or more digital signal processors (DSP), one or more field programmable gate arrays (FPGA), or a combination of at least two of these integrated circuits. For another example, when the units in the apparatus may be implemented in a form in which a processing element schedules a program, the processing element may be a general purpose processor, for example, a central processing unit (CPU) or another processor that can invoke the program. For another example, the units may be integrated together and implemented in a form of a system-on-a-chip (SOC).

Figure 20:
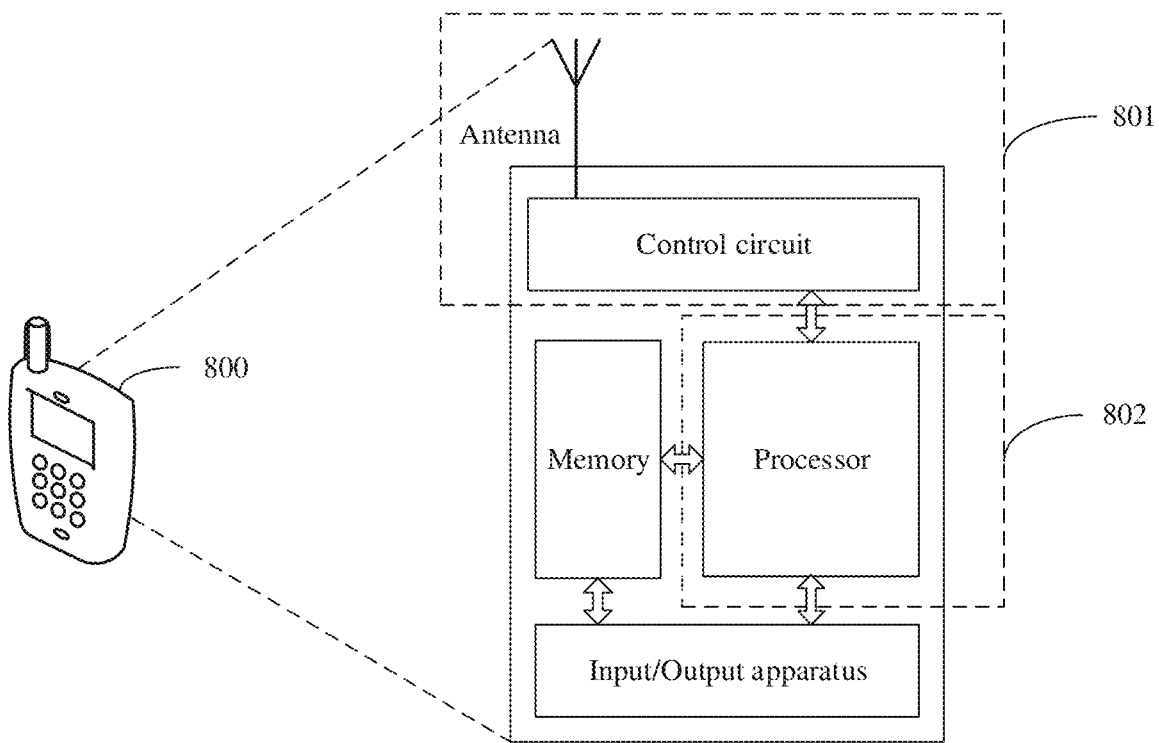
FIG. 20 is a schematic diagram of a terminal device according to an embodiment of this application.

FIG. 20 is a schematic diagram of a structure of a terminal device 800 according to this application. The apparatus 600 or 700 may be configured in the terminal device 800. Alternatively, the apparatus 600 or 700 may be the terminal device 800. In other words, the terminal device 800 may perform an action performed by the receiving device in the foregoing method embodiment.

For ease of description, FIG. 20 shows only main components of the terminal device. As shown in FIG. 20, the terminal device 800 includes a processor, a memory, a control circuit, an antenna, and an input/output apparatus.

The processor is mainly configured to: process a communications protocol and communications data, control the entire terminal device, execute a software program, and process data of the software program, for example, configured to support the terminal device in performing actions described in the foregoing resource unit combination indication method embodiment. The memory is mainly configured to: store the software program and the data, for example, store a codebook described in the foregoing embodiment. The control circuit is mainly configured to: perform conversion between a baseband signal and a radio frequency signal, and process the radio frequency signal. A combination of the control circuit and the antenna may also be referred to as a transceiver, mainly configured to send/receive a radio frequency signal in an electromagnetic wave form. The input/output apparatus, for example, a touchscreen, a display, a keyboard, or the like is mainly configured to: receive data input by a user, and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 20 shows only one memory and only one processor. An actual terminal device may include a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communications protocol and the communications data. The central processing unit is mainly configured to: control the entire terminal device, execute the software program, and process the data of the software program. The processor in FIG. 20 integrates functions of the baseband processor and the central processing unit. The person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communications data may be embedded in the processor, or may be stored in a storage unit in a form of the software program. The processor executes the software program to implement a baseband processing function.

For example, in this embodiment of this application, the antenna and the control circuit that have receiving and sending functions may be considered as a transceiver unit 801 of the terminal device 800, and the processor having a processing function may be considered as a processing unit 802 of the terminal device 800. As shown in FIG. 10, the terminal device 800 includes the transceiver unit 801 and the processing unit 802. The transceiver unit may also be referred to as a transceiver, a transceiver machine, a transceiver apparatus, or the like. Optionally, a component configured to implement a receiving function in the transceiver unit 801 may be considered as a receiving unit, and a component configured to implement a sending function in the transceiver unit 801 may be considered as a sending unit. In other words, the transceiver unit 801 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

Figure 21:
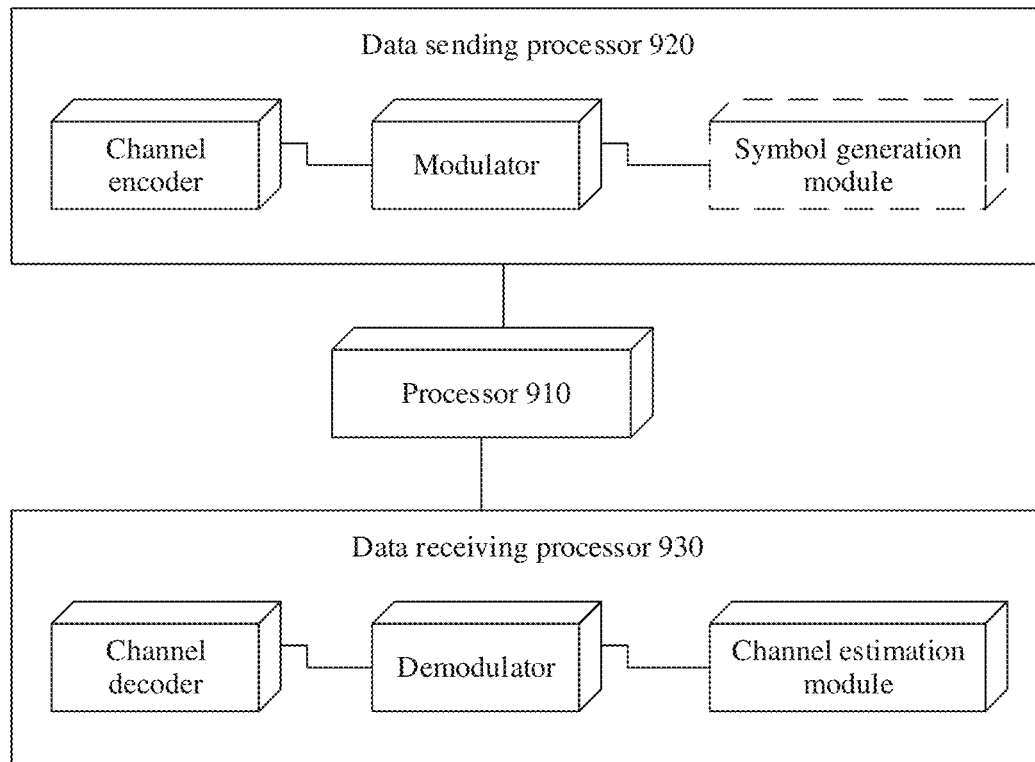
FIG. 21 is a schematic diagram of another terminal device according to an embodiment of this application.

FIG. 21 is a schematic diagram of a structure of another terminal device 900 according to this application. In FIG. 21, the terminal device includes a processor 910, a data sending processor 920, and a data receiving processor 930. The processing unit 620 in the foregoing embodiment may be the processor 910 in FIG. 21, and implements a corresponding function. The communications unit 610 in the foregoing embodiment may be the data sending processor 920 and/or the data receiving processor 930 in FIG. 21. FIG. 21 shows a channel coder and a channel decoder. However, it may be understood that these modules do not constitute a limitation on this embodiment, but are only an example.

Figure 22:
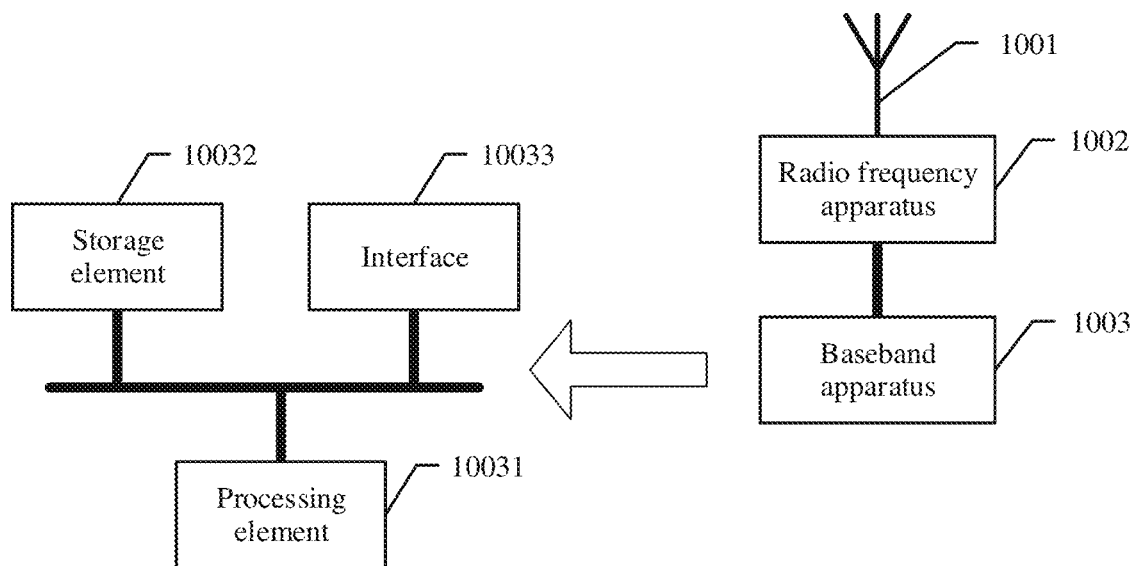
FIG. 22 is a schematic diagram of a network device according to an embodiment of this application.

FIG. 22 is a schematic diagram of a structure of a network device according to an embodiment of this application. The network device is configured to implement operations of the network device (namely, the sending device) in the foregoing embodiment. As shown in FIG. 22, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, through the antenna 1001, information sent by a terminal device, and sends, to the baseband apparatus 1003 for processing, the information sent by the terminal device. In a downlink direction, the baseband apparatus 1003 processes information about the terminal, and sends the information to the radio frequency apparatus 1002. The radio frequency apparatus 1002 processes the information about the terminal, and then sends processed information to the terminal through the antenna 1001.

The baseband apparatus 1003 may include one or more processing elements 10031, for example, include a main control CPU and another integrated circuit. In addition, the baseband apparatus 1003 may further include a storage element 10032 and an interface 10033. The storage element 10032 is configured to store a program and data. The interface 10033 is configured to exchange information with the radio frequency apparatus 1002, and the interface is, for example, a common public radio interface (CPRI). The foregoing apparatus used in the network device may be located in the baseband apparatus 1003. For example, the foregoing apparatus used in the network device may be a chip in the baseband apparatus 1003. The chip includes at least one processing element and an interface circuit. The processing element is configured to perform steps in any method performed by the network device. The interface circuit is configured to communicate with another apparatus. In an implementation, units in the network device for implementing the steps in the foregoing methods may be implemented in a form of scheduling a program by the processing element. For example, the apparatus used in the network device includes a processing element and a storage element. The processing element invokes a program stored in the storage element, to perform the method performed by the network device in the foregoing method embodiment. The storage element may be a storage element that is located on a same chip as the processing element, namely, an on-chip storage element, or may be a storage element that is located on a different chip from the processing element, namely, an off-chip storage element.

Figure 23:
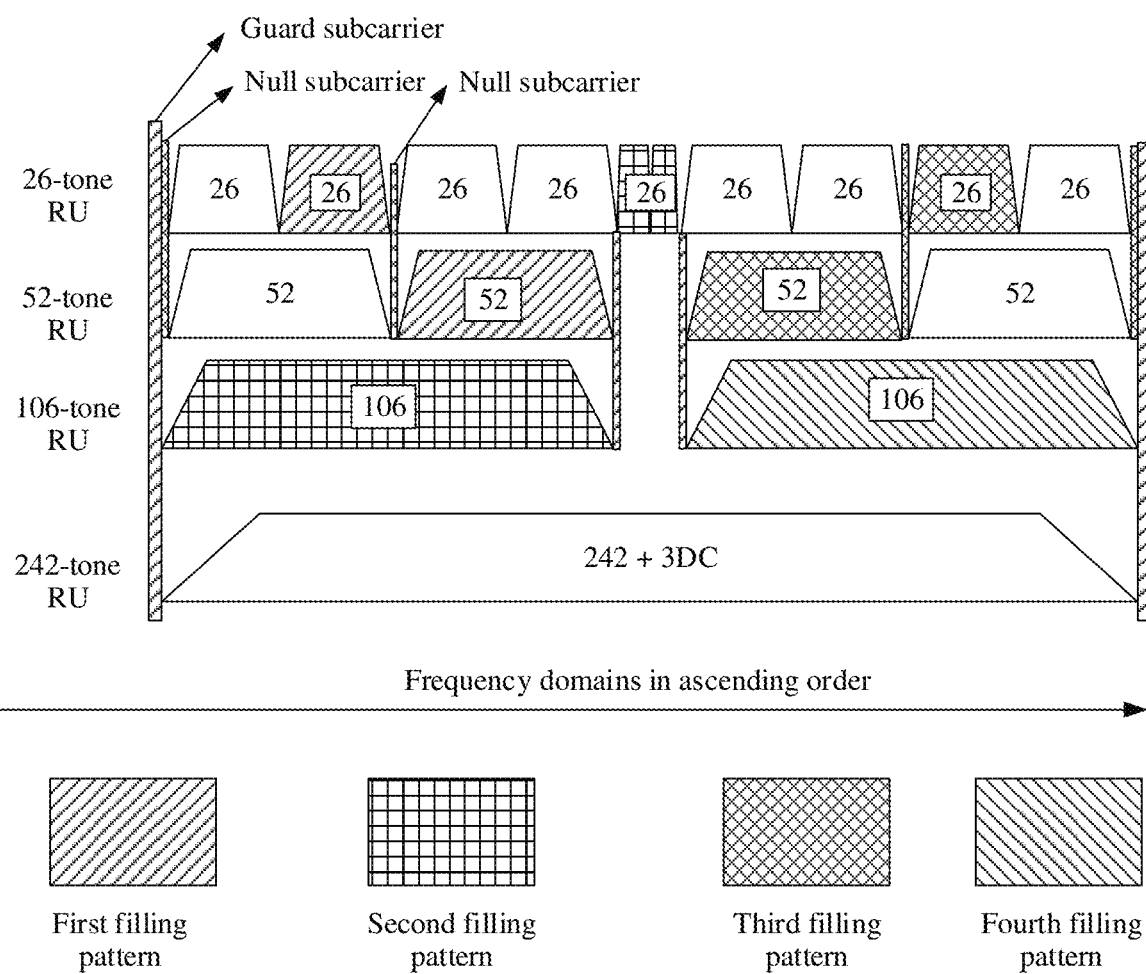
FIG. 23 is a schematic diagram of various combination manners of resource units when a data packet bandwidth is 20 MHz according to an embodiment of this application.

Optionally, in some other possible implementations of this application, for combination of small-size RUs within a 242-tone RU, when a combination indication is 2 bits within a 20-MHz channel and when the 2 bits are set to 00, it indicates that there is no multi-RU combination in a resource unit allocation manner, that is, there is no multi-RU. When the 2 bits are set to 01, it indicates that a second 52-tone RU and a second 26-tone RU are combined into one multi-RU. To be specific, the second 52-tone RU and a left neighboring 26-tone RU of the second 52-tone RU are combined into one multi-RU. For example, as shown in FIG. 23, sorting is performed in ascending order of frequency domains within the 20-MHz channel, and the 20-MHz channel may include nine 26-tone RUs. Alternatively, the 20-MHz channel may include four 52-tone RUs or two 106-tone RUs. The second 26-tone RU is located in the second of the nine 26-tone RUs, and the second 52-tone RU is located in the second of the four 52-tone RUs. In FIG. 23, a 26-tone RU marked as a first filling pattern in a first row is the foregoing second 26-tone RU. A 52-tone RU marked as the first filling pattern in a second row is the foregoing second 52-tone RU. Alternatively, when the 2 bits are set to 01, it indicates that a first 106-tone RU and a center 26-tone RU (namely, a fifth 26-tone RU) within the 20-MHz channel are combined into one multi-RU. In FIG. 23, a 106-tone RU marked as a third filling pattern in a third row is the foregoing first 106-tone RU, and a 26-tone RU marked as a second filling pattern in the first row is the foregoing fifth 26-tone RU (the center 26-tone RU within the 20-MHz channel). In FIG. 23, RUs with a same filling pattern may be combined into one multi-RU.

When the 2 bits are set to 10, it indicates that a third 52-tone RU and an eighth 26-tone RU are combined into one multi-RU. To be specific, the third 52-tone RU and a right neighboring 26-tone RU of the third 52-tone RU are combined into one multi-RU. The third 52-tone RU is located in the third of the four 52-tone RUs, and the eighth 26-tone RU is located in the eighth of the nine 26-tone RUs. As shown in FIG. 23, a 52-tone RU marked as the third filling pattern in the second row is the foregoing third 52-tone RU, and a 26-tone RU marked as the third filling pattern in the first row is the foregoing eighth 26-tone RU.

Alternatively, when the 2 bits are set to 10, it indicates that a second 106-tone RU and a center 26-tone RU (namely, a fifth 26-tone RU) within the 20-MHz channel are combined into one multi-RU. In FIG. 23, a 106-tone RU marked as a fourth filling pattern in the third row is the foregoing second 106-tone RU, and the center 26-tone RU within the 20-MHz channel is a 26-tone RU marked as the second filling pattern in the first row.

When the 2 bits are set to 11, it indicates that RU combination indicated by setting the 2 bits to 01 and RU combination indicated by setting the 2 bits to 10 exist.

It should be understood that, in this embodiment of this application, meanings indicated by the values of the 2 bits may be interchanged. For example, content indicated by setting the 2 bits to 01 may be interchanged with content indicated by setting the 2 bits to 10, content indicated by setting the 2 bits to 01 may be interchanged with content indicated by setting the 2 bits to 11, or content indicated by setting the 2 bits to 10 may be interchanged with content indicated by setting the 2 bits to 11. In other words, specific values of the 2 bits in the foregoing example should not constitute any limitation on this embodiment of this application.

Figure 24:
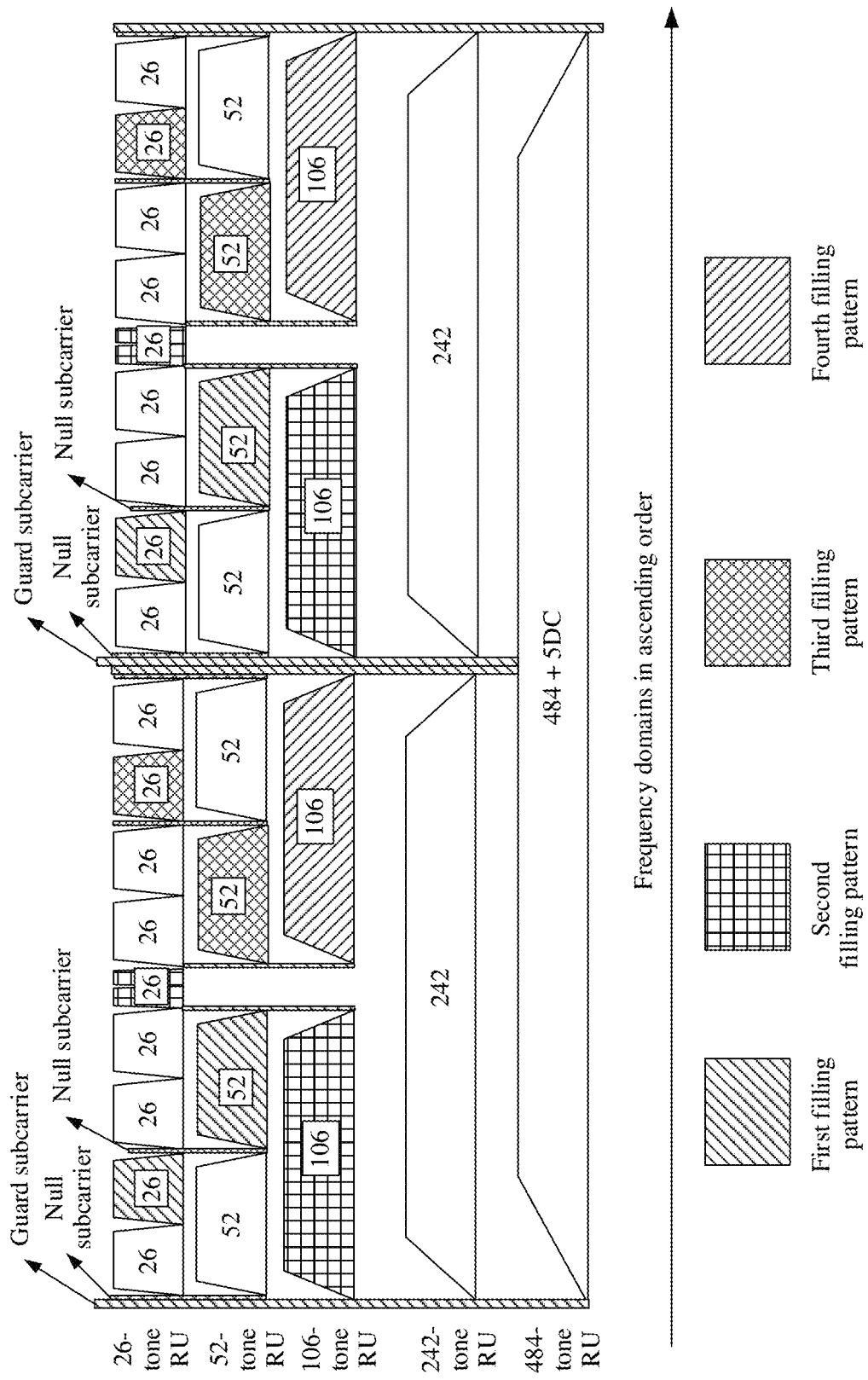
FIG. 24 is a schematic diagram of various combination manners of resource units when a data packet bandwidth is 40 MHz according to an embodiment of this application.

When it is on a 40-MHz bandwidth, because the 40-MHz bandwidth is approximately equivalent to a replication of subcarrier distribution of the 20-MHz channel, and as shown in FIG. 24, small-size RUs are not combined across the 20-MHz channel, combination may be performed on each 20-MHz channel based on a combination indication and a combination manner shown in FIG. 23.

Similarly, for an 80-MHz bandwidth, a 160-MHz bandwidth, and a 320-MHz bandwidth, small-size RUs are not combined across the 20-MHz channel. On each 20-MHz channel, combination may be performed based on the combination indication and the combination manner shown in FIG. 23.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated together to form a chip.

The units of the network device that implement the steps in the foregoing methods may be integrated together, and implemented in a form of a system-on-a-chip. For example, the baseband apparatus includes the SOC chip, configured to implement the foregoing method.

The terminal device and the network device in the foregoing apparatus embodiment may exactly correspond to the receiving device or the sending device in the method embodiment, and a corresponding module or unit performs a corresponding step. For example, when the apparatus is implemented in a form of a chip, the receiving unit may be an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal from another chip or apparatus.

An embodiment of this application further provides a communications system. The communications system includes the foregoing sending device and the foregoing receiving device.

An embodiment of this application further provides a computer-readable medium, configured to store computer program code. The computer program includes instructions used to perform the resource unit combination indication method in this embodiment of this application in the foregoing method embodiment. The readable medium may be a read-only memory (ROM) or a random access memory (RAM). This is not limited in this embodiment of this application.

This application further provides a computer program product. The computer program product includes instructions. When the instructions are executed, a sending device and a receiving device are enabled to perform operations corresponding to the sending device and the receiving device in the foregoing method.

An embodiment of this application further provides a system chip. The system chip includes a processing unit and a communications unit. The processing unit may be, for example, a processor, and the communications unit may be, for example, an input/output interface, a pin, a circuit, or the like. The processing unit may execute computer instructions, so that the chip in the communications apparatus performs any resource unit combination indication method provided in the foregoing embodiment of this application.

Optionally, the computer instructions are stored in a storage unit.

Optionally, the storage unit is a storage unit in the chip, for example, a register or a cache. The storage unit may further be a storage unit, such as a ROM, another type of static storage device that can store static information and instructions, or a RAM, that is outside the chip and that is in the terminal. The processor mentioned in any of the foregoing descriptions may be a CPU, a microprocessor, an ASIC, or one or more integrated circuits for controlling program execution of the foregoing resource unit combination indication method. The processing unit and the storage unit may be decoupled, are separately disposed on different physical devices, and are connected in a wired or wireless manner to implement respective functions of the processing unit and the storage unit, to support the system chip in implementing various functions in the foregoing embodiment. Alternatively, the processing unit and the memory may be coupled to a same device.

It may be understood that the memory in embodiments of this application may be a volatile memory or a non-volatile memory, or may include both a volatile memory and a non-volatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synch link DRAM, SLDRAM), and a direct rambus random access memory (direct rambus RAM, DR RAM).

The terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

Terms "uplink" and "downlink" in this application are used to describe a data/information transmission direction in a specific scenario. For example, the "uplink" direction usually refers to a direction in which data/information is transmitted from a terminal to a network side, or a direction in which a distributed unit transmits data/information to a centralized unit, and the "downlink" direction usually refers to a direction in which data/information is transmitted from a network side to a terminal. Alternatively, in a transmission direction from the centralized unit to the distributed unit, it may be understood that "uplink" and "downlink" are merely used to describe a data/information transmission direction, and a specific start/end device of the data/information transmission is not limited.

In this application, names may be assigned to various objects such as various messages/information/devices/network elements/systems/apparatuses/actions/operations/procedures/concepts. It may be understood that these specific names do not constitute a limitation on related objects, the assigned names may change with factors such as a scenario, a context, or a use habit. Technical meanings of technical terms in this application should be mainly understood based on functions and technical effects reflected/executed by the technical terms in the technical solutions.

In embodiments of this application, unless otherwise stated or there is a logic conflict, terms and/or description between different embodiments are/is consistent and may be mutually referenced, and technical features in different embodiments may be combined based on an internal logical relationship thereof, to form a new embodiment.

All or some of the methods in embodiments of this application may be implemented by software, hardware, firmware, or any combination thereof. When the software is used to implement embodiments, all or a part of embodiments may be implemented in a form of a computer program product. The computer program product includes one or more computer programs or instructions. When the computer programs or the instructions are loaded and executed on a computer, the procedures or functions in embodiments of this application are completely or partially generated. The computer may be a general-purpose computer, a special-purpose computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
a non-transitory memory storage comprising instructions; and
one or more processors in communication with the memory storage, wherein the instructions are executable by the one or more processors to cause the apparatus to:
receive a physical layer protocol data unit (PPDU), wherein the PPDU comprises a signal field, the signal field comprises one or more resource unit allocation subfields, at least one resource unit allocation subfield of the one or more resource unit allocation subfields indicates a size and a location of a multi-resource unit (multi-RU), each multi-RU indicated by the at least one resource unit allocation subfield comprises at least two resource units (RUs), and each resource unit allocation subfield of the at least one resource unit allocation subfield comprises 9 bits; and
determine the size and the location of each multi-RU indicated by the at least one resource unit allocation subfield based on the PPDU.

2. The apparatus according to claim 1, wherein the signal field further comprises at least one user field, and a sequence of the at least one user field corresponds to a sequence of an allocation of resource units indicated by the one or more resource unit allocation subfields.

3. The apparatus according to claim 1, wherein each multi-RU occupies at least a 20-MHz channel corresponding to the resource unit allocation subfield that indicates the respective multi-RU.

4. The apparatus according to claim 1, wherein one or more multi-RUs indicated by the at least one resource unit allocation subfield comprise one multi-RU, and wherein:
the one multi-RU comprises one 26-tone RU and one 52-tone RU;
the one multi-RU comprises one 26-tone RU and one 106-tone RU;
the one multi-RU comprises one 52-tone RU and one 106-tone RU;
the one multi-RU comprises one 242-tone RU and another 242-tone RU;
the one multi-RU comprises one 242-tone RU and one 484-tone RU;
the one multi-RU comprises one 242-tone RU, one 484-tone RU, and one 996-tone RU;
the one multi-RU comprises three 996-tone RUs; or
the one multi-RU comprises one 484-tone RU and one 996-tone RU.

5. The apparatus according to claim 1, wherein one or more multi-RUs indicated by the at least one allocation subfield comprise one multi-RU, wherein the one multi-RU is located in a 20-MHz channel, and wherein:

the 20-MHz channel comprises eight RUs, and in ascending order of frequencies, a first RU is a 26-tone RU, a second RU is a 26-tone RU, a third RU is a 26-tone RU, a fourth RU is a 26-tone RU, a fifth RU is a 26-tone RU, a sixth RU is a 52-tone RU, a seventh RU is a 26-tone RU, an eighth RU is a 26-tone RU, and the one multi-RU comprises the sixth RU and the seventh RU;

the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, and the one multi-RU comprises the fifth RU and the sixth RU;

the 20-MHz channel comprises seven RUs, and in ascending order of frequencies, a first RU is a 52-tone RU, a second RU is a 26-tone RU, a third RU is a 26-tone RU, a fourth RU is a 26-tone RU, a fifth RU is a 52-tone RU, a sixth RU is a 26-tone RU, a seventh RU is a 26-tone RU, and the one multi-RU comprises the fifth RU and the sixth RU;

the 20-MHz channel comprises six RUs, and in ascending order of frequencies, a first RU is a 52-tone RU, a second RU is a 52-tone RU, a third RU is a 26-tone RU, a fourth RU is a 52-tone RU, a fifth RU is a 26-tone RU, a sixth RU is a 26-tone RU, and the one multi-RU comprises the fourth RU and the fifth RU;

the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, and the one multi-RU comprises the third RU and the fourth RU;

the 20-MHz channel comprises eight RUs, and in ascending order of frequencies, a first RU is a 26-tone RU, a second RU is a 26-tone RU, a third RU is a 52-tone RU, a fourth RU is a 26-tone RU, a fifth RU is a 26-tone RU, a sixth RU is a 26-tone RU, a seventh RU is a 26-tone RU, an eighth RU is a 26-tone RU, and the one multi-RU comprises the second RU and the third RU;

the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 26-tone RU, a sixth RU is a 26-tone RU, a seventh RU is a 52-tone RU, and the one multi-RU comprises the second RU and the third RU;

the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, and the one multi-RU comprises the second RU and the third RU;

the 20-MHz channel comprises six RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 52-tone RU, and the one multi-RU comprises the second RU and the third RU;

the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, and the one multi-RU comprises the second RU and the third RU;

the 20-MHz channel comprises six RUs, and in ascending order of frequencies, a first RU is a 26-tone RU, a second RU is a 26-tone RU, a third RU is a 26-tone RU, a fourth RU is a 26-tone RU, a fifth RU is a 26-tone RU, a sixth RU is a 106-tone RU, and the one multi-RU comprises the fifth RU and the sixth RU;

the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, and the one multi-RU comprises the fourth RU and the fifth RU;

the 20-MHz channel comprises five RUs, and in ascending order of frequencies, a first RU is a 52-tone RU, a second RU is a 26-tone RU, a third RU is a 26-tone RU, a fourth RU is a 26-tone RU, a fifth RU is a 106-tone RU, and the one multi-RU comprises the fourth RU and the fifth RU;

the 20-MHz channel comprises four RUs, and in ascending order of frequencies, a first RU is a 52-tone RU, a second RU is a 52-tone RU, a third RU is a 26-tone RU, a fourth RU is a 106-tone RU, and the one multi-RU comprises the third RU and the fourth RU;

the 20-MHz channel comprises three RUs, and in ascending order of frequencies, a first RU is a 106-tone RU, a second RU is a 106-tone RU, a third RU is a 26-tone RU, and the one multi-RU comprises the second RU and the third RU;

the 20-MHz channel comprises six RUs, and in ascending order of frequencies, a first RU is a 106-tone RU, a second RU is a 26-tone RU, a third RU is a 26-tone RU, a fourth RU is a 26-tone RU, a fifth RU is a 26-tone RU, a sixth RU is a 26-tone RU, and the one multi-RU comprises the first RU and the second RU;

the 20-MHz channel comprises five RUs, and in ascending order of frequencies, a first RU is a 106-tone RU, a second RU is a 26-tone RU, a third RU is a 26-tone RU, a fourth RU is a 26-tone RU, a fifth RU is a 52-tone RU, and the one multi-RU comprises the first RU and the second RU;

the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, and the one multi-RU comprises the first RU and the second RU;

the 20-MHz channel comprises four RUs, and in ascending order of frequencies, a first RU is a 106-tone RU, a second RU is a 26-tone RU, a third RU is a 52-tone RU, a fourth RU is a 52-tone RU, and the one multi-RU comprises the first RU and the second RU;

the 20-MHz channel comprises three RUs, and in ascending order of frequencies, a first RU is a 106-tone RU, a second RU is a 26-tone RU, a third RU is a 106-tone RU, and the one multi-RU comprises the first RU and the second RU; or the 20-MHz channel comprises five RUs, and in ascending order of frequencies, a first RU is a 52-tone RU, a second RU is a 52-tone RU, a third RU is a 26-tone RU, a fourth RU is a 52-tone RU, a fifth RU is a 52-tone RU, and the one multi-RU comprises the second RU and the third RU.

6. The apparatus according to claim 1, wherein one or more multi-RUs indicated by the at least one allocation subfield comprise two multi-RUs, and wherein:

in the two multi-RUs, one multi-RU comprises one 26-tone RU and one 52-tone RU, and the other multi-RU comprises one 26-tone RU and one 106-tone RU; or each of the two multi-RUs comprises one 26-tone RU and one 52-tone RU.

7. The apparatus according to claim 1, wherein one or more multi-RUs indicated by the at least one allocation subfield comprise two multi-RUs, and the two multi-RUs are located in a 20-MHz channel, and wherein:
the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, one of the two multi-RUs comprises the first RU and the second RU, and the other one of the two multi-RUs comprises the third RU and the fourth RU;
the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, one of the two multi-RUs comprises the second RU and the third RU, and the other one of the two multi-RUs comprises the fourth RU and the fifth RU; or
the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, one of the two multi-RUs comprises the second RU and the third RU, and the other one of the two multi-RUs comprises the fifth RU and the sixth RU.

8. The apparatus according to claim 1, wherein one or more multi-RUs indicated by the at least one allocation subfield comprise three multi-RUs, and each of the three multi-RUs comprises one 26-tone RU and one 52-tone RU.

9. The apparatus according to claim 1, wherein at least two RUs comprised in one or more multi-RUs indicated by the at least one resource unit allocation subfield are not neighboring to each other.

10. The apparatus according to claim 1, wherein any two RUs comprised in one or more multi-RUs indicated by the at least one resource unit allocation subfield are neighboring to each other.

11. A method, comprising:
receiving a physical layer protocol data unit (PPDU), wherein the PPDU comprises a signal field, the signal field comprises one or more resource unit allocation subfields, at least one resource unit allocation subfield of the one or more resource unit allocation subfields indicates a size and a location of a multi-resource unit (multi-RU), each multi-RU indicated by the at least one resource unit allocation subfield comprises at least two resource units (RUs), and each resource unit allocation subfield of the at least one resource unit allocation subfield comprises 9 bits; and
determining the size and the location of each multi-RU indicated by the at least one resource unit allocation subfield based on the PPDU.

12. The method according to claim 11, wherein the signal field further comprises at least one user field, and a sequence of the at least one user field corresponds to a sequence of an allocation of resource units indicated by the one or more resource unit allocation subfields.

13. The method according to claim 11, wherein each multi-RU occupies at least a 20-MHz channel corresponding to the resource unit allocation subfield that indicates the respective multi-RU.

14. The method according to claim 11, wherein one or more multi-RUs indicated by the at least one resource unit allocation subfield comprise one multi-RU, and wherein:
the one multi-RU comprises one 26-tone RU and one 52-tone RU;
the one multi-RU comprises one 26-tone RU and one 106-tone RU;
the one multi-RU comprises one 52-tone RU and one 106-tone RU;
the one multi-RU comprises one 242-tone RU and another 242-tone RU;
the one multi-RU comprises one 242-tone RU and one 484-tone RU;
the one multi-RU comprises one 242-tone RU, one 484-tone RU, and one 996-tone RU;
the one multi-RU comprises three 996-tone RUs; or
the one multi-RU comprises one 484-tone RU and one 996-tone RU.

15. The method according to claim 11, wherein one or more multi-RUs indicated by the at least one allocation subfield comprise one multi-RU, wherein the one multi-RU is located in a 20-MHz channel, and wherein:
the 20-MHz channel comprises eight RUs, and in ascending order of frequencies, a first RU is a 26-tone RU, a second RU is a 26-tone RU, a third RU is a 26-tone RU, a fourth RU is a 26-tone RU, a fifth RU is a 26-tone RU, a sixth RU is a 52-tone RU, a seventh RU is a 26-tone RU, an eighth RU is a 26-tone RU, and the one multi-RU comprises the sixth RU and the seventh RU;
the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, and the one multi-RU comprises the fifth RU and the sixth RU;
the 20-MHz channel comprises seven RUs, and in ascending order of frequencies, a first RU is a 52-tone RU, a second RU is a 26-tone RU, a third RU is a 26-tone RU, a fourth RU is a 26-tone RU, a fifth RU is a 52-tone RU, a sixth RU is a 26-tone RU, a seventh RU is a 26-tone RU, and the one multi-RU comprises the fifth RU and the sixth RU;
the 20-MHz channel comprises six RUs, and in ascending order of frequencies, a first RU is a 52-tone RU, a second RU is a 52-tone RU, a third RU is a 26-tone RU, a fourth RU is a 52-tone RU, a fifth RU is a 26-tone RU, a sixth RU is a 26-tone RU, and the one multi-RU comprises the fourth RU and the fifth RU;
the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, and the one multi-RU comprises the third RU and the fourth RU;
the 20-MHz channel comprises eight RUs, and in ascending order of frequencies, a first RU is a 26-tone RU, a second RU is a 26-tone RU, a third RU is a 52-tone RU, a fourth RU is a 26-tone RU, a fifth RU is a 26-tone RU, a sixth RU is a 26-tone RU, a seventh RU is a 26-tone RU, an eighth RU is a 26-tone RU, and the one multi-RU comprises the second RU and the third RU;

the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 26-tone RU, a sixth RU is a 26-tone RU, a seventh RU is a 52-tone RU, and the one multi-RU comprises the second RU and the third RU;

the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, and the one multi-RU comprises the second RU and the third RU;

the 20-MHz channel comprises six RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 52-tone RU, and the one multi-RU comprises the second RU and the third RU;

the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, and the one multi-RU comprises the second RU and the third RU;

the 20-MHz channel comprises six RUs, and in ascending order of frequencies, a first RU is a 26-tone RU, a second RU is a 26-tone RU, a third RU is a 26-tone RU, a fourth RU is a 26-tone RU, a fifth RU is a 26-tone RU, a sixth RU is a 106-tone RU, and the one multi-RU comprises the fifth RU and the sixth RU;

the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, and the one multi-RU comprises the fourth RU and the fifth RU;

the 20-MHz channel comprises five RUs, and in ascending order of frequencies, a first RU is a 52-tone RU, a second RU is a 26-tone RU, a third RU is a 26-tone RU, a fourth RU is a 26-tone RU, a fifth RU is a 106-tone RU, and the one multi-RU comprises the fourth RU and the fifth RU;

the 20-MHz channel comprises four RUs, and in ascending order of frequencies, a first RU is a 52-tone RU, a second RU is a 52-tone RU, a third RU is a 26-tone RU, a fourth RU is a 106-tone RU, and the one multi-RU comprises the third RU and the fourth RU;

the 20-MHz channel comprises three RUs, and in ascending order of frequencies, a first RU is a 106-tone RU, a second RU is a 106-tone RU, a third RU is a 26-tone RU, and the one multi-RU comprises the second RU and the third RU;

the 20-MHz channel comprises six RUs, and in ascending order of frequencies, a first RU is a 106-tone RU, a second RU is a 26-tone RU, a third RU is a 26-tone RU, a fourth RU is a 26-tone RU, a fifth RU is a 26-tone RU, a sixth RU is a 26-tone RU, and the one multi-RU comprises the first RU and the second RU;

the 20-MHz channel comprises five RUs, and in ascending order of frequencies, a first RU is a 106-tone RU, a second RU is a 26-tone RU, a third RU is a 26-tone RU, a fourth RU is a 26-tone RU, a fifth RU is a 52-tone RU, and the one multi-RU comprises the first RU and the second RU;

the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, and the one multi-RU comprises the first RU and the second RU;

the 20-MHz channel comprises four RUs, and in ascending order of frequencies, a first RU is a 106-tone RU, a second RU is a 26-tone RU, a third RU is a 52-tone RU, a fourth RU is a 52-tone RU, and the one multi-RU comprises the first RU and the second RU;

the 20-MHz channel comprises three RUs, and in ascending order of frequencies, a first RU is a 106-tone RU, a second RU is a 26-tone RU, a third RU is a 106-tone RU, and the one multi-RU comprises the first RU and the second RU; or the 20-MHz channel comprises five RUs, and in ascending order of frequencies, a first RU is a 52-tone RU, a second RU is a 52-tone RU, a third RU is a 26-tone RU, a fourth RU is a 52-tone RU, a fifth RU is a 52-tone RU, and the one multi-RU comprises the second RU and the third RU.

16. The method according to claim 11, wherein one or more multi-RUs indicated by the at least one allocation subfield comprise two multi-RUs, and wherein:
in the two multi-RUs, one multi-RU comprises one 26-tone RU and one 52-tone RU, and the other multi-RU comprises one 26-tone RU and one 106-tone RU; or
each of the two multi-RUs comprises one 26-tone RU and one 52-tone RU.

17. The method according to claim 11, wherein one or more multi-RUs indicated by the at least one allocation subfield comprise two multi-RUs, and the two multi-RUs are located in a 20-MHz channel, and wherein:
the 20-MHz channel comprises five RUs, and in ascending order of frequencies, a first RU is a 106-tone RU, a second RU is a 26-tone RU, a third RU is a 52-tone RU, a fourth RU is a 26-tone RU, a fifth RU is a 26-tone RU, one of the two multi-RUs comprises the first RU and the second RU, and the other one of the two multi-RUs comprises the third RU and the fourth RU;
the 20-MHz channel comprises five RUs, and in ascending order of frequencies, a first RU is a 26-tone RU, a second RU is a 26-tone RU, a third RU is a 52-tone RU, a fourth RU is a 26-tone RU, a fifth RU is a 106-tone RU, one of the two multi-RUs comprises the second RU and the third RU, and the other one of the two multi-RUs comprises the fourth RU and the fifth RU; or
the 20-MHz channel comprises seven RUs, and in ascending order of frequencies, a first RU is a 26-tone RU, a second RU is a 26-tone RU, a third RU is a 52-tone RU, a fourth RU is a 26-tone RU, a fifth RU is a 52-tone RU, a sixth RU is a 26-tone RU, a seventh RU is a 26-tone RU, one of the two multi-RUs comprises the second RU and the third RU, and the other one of the two multi-RUs comprises the fifth RU and the sixth RU.

18. The method according to claim 11, wherein one or more multi-RUs indicated by the at least one allocation subfield comprise three multi-RUs, and each of the three multi-RUs comprises one 26-tone RU and one 52-tone RU.

19. The method according to claim 11, wherein at least two RUs comprised in one or more multi-RUs indicated by the at least one resource unit allocation subfield are not neighboring to each other.

20. The method according to claim 11, wherein any two RUs comprised in one or more multi-RUs indicated by the at least one resource unit allocation subfield are neighboring to each other.

* * * * *